United States Patent
Hastings et al.

(10) Patent No.: US 8,428,417 B1
(45) Date of Patent: Apr. 23, 2013

(54) MODULAR SOLAR COLLECTOR SYSTEM AND METHOD

(75) Inventors: Glenn Arthur Hastings, Denton, TX (US); Kevin Mark Klughart, Denton, TX (US)

(73) Assignee: Glenn Arthur Hastings, Denton, TX (US)

( * ) Notice: Subject to any disclaimer, the term of this patent is extended or adjusted under 35 U.S.C. 154(b) by 88 days.

(21) Appl. No.: 13/317,309

(22) Filed: Oct. 15, 2011

Related U.S. Application Data

(60) Provisional application No. 61/455,180, filed on Oct. 15, 2010.

(51) Int. Cl.
  *G02B 6/00* (2006.01)
(52) U.S. Cl.
  USPC .............................. 385/131; 385/146; 385/147
(58) Field of Classification Search .................. 385/131, 385/146, 147, 134; 126/425, 438, 440; 250/491.1; 136/246; 353/3
  See application file for complete search history.

(56) References Cited

U.S. PATENT DOCUMENTS

| | | | |
|---|---|---|---|
| 4,377,154 A | 3/1983 | Meckler | |
| 4,467,787 A | 8/1984 | Ueda | |
| 4,838,645 A * | 6/1989 | Machler et al. | 359/571 |
| 7,885,506 B2 * | 2/2011 | Levola | 385/146 |
| 2005/0081909 A1 | 4/2005 | Paull | |
| 2009/0078303 A1 | 3/2009 | Brezoczky | |
| 2012/0006382 A1 * | 1/2012 | Dagli et al. | 136/246 |

\* cited by examiner

*Primary Examiner* — Ellen Kim
(74) *Attorney, Agent, or Firm* — Kevin M. Klughart; Carstens & Cahoon, LLP

(57) ABSTRACT

A modular solar collector system (MSCS) and modular solar collector method (MSCM) utilizing one or more solar/optical radiation waveguides (SOWs) having radiation input, radiation output, and radiation injection ports is disclosed. The MSCS permits individual SOWs to be cascaded in a modular fashion to permit collection and transmission of incident solar radiation in combination with radiation received from adjacent SOWs. The collection/summation nature of the SOWs may be utilized in vector and/or array configurations to permit collection and transmission of arbitrary areas of incident solar radiation to a focal point, vector, and/or area for the purposes of utilizing the collected radiation for a variety of purposes. The SOWs may optimally incorporate optically reflective areas on surfaces not comprising the radiation input, radiation output, and radiation injection ports to maximize the overall collection and transmission of radiation from the radiation input and radiation injection ports to the radiation output port.

40 Claims, 32 Drawing Sheets

MODULAR SOLAR COLLECTOR SYSTEM AND METHOD

CROSS REFERENCE TO RELATED APPLICATIONS

Applicants claim benefit pursuant to 35 U.S.C. §119 and hereby incorporates by reference Provisional Patent Application for "MODULAR SOLAR COLLECTOR SYSTEM AND METHOD", Ser. No. 61/455,180, filed Oct. 15, 2010, and submitted to the USPTO with Express Mail on Oct. 15, 2010 with tracking number EH474064931US.

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

The present invention generally relates to solar energy collection systems and related methods, generally including but not limited to United States Patent Classes 126/425, 126/438, 126/440, 250/491.1, 136/246, 350/289, 353/3. The disclosed invention is typically utilized in conjunction with a heat transfer and/or solar energy electrical generation system.

PRIOR ART AND BACKGROUND OF THE INVENTION

Overview

The prior art is generally limited in most circumstances to solar collection systems utilizing parabolic reflectors, many embodiments of which incorporate mechanized tracking systems to ensure that the sun is tracked as it moves across the sky to permit optimal collection of solar radiation.

The prior art teaches that passive systems generally are not efficient and cannot be scaled on any linear fashion to collect solar energy on any type of modular collection paradigm. Furthermore, most efficient means of solar collectors have significant horizontal and vertical footprints, making them inappropriate for many applications such as roads, industrial plant grounds, building exterior walls, building tops, and the like. As such, the current state of the prior art has a significant need for efficient solar collection methodologies having low profile form factors that are also modular in nature and extensible over a wide localized area on both a horizontal and vertical installation placement.

Representative Prior Art

The prior art may be generally represented by the following United States Patents:
- U.S. Pat. No. 4,377,154 issued to Milton Meckler for PRISMATIC TRACKING INSOLATION on Mar. 22, 1983 which describes a tracking insolation collector characterized by elongated prisms of acute apex angle maintained with an objective face disposed normal to the sun rays and through which dispersed light is projected from a transmission face an onto a coordinated mirror for geometrical focus onto a target.
- U.S. Pat. No. 4,467,787 issued to Naoaki Ueda for STATIC SOLAR TRACKINGG MECHANISM on Aug. 28, 1984 which describes a solar tracking mechanism utilizing a semicircle collector trough body having an inner concave surface having a focal point at the center of the circle defined by the uppermost flat surface of the trough body, the upper flat portion of the trough body normally being generally horizontally disposed.
- U.S. Patent Application Publication US 2005/0081909 A1 with inventor James B. Paull for CONCENTRATING SOLAR ROOFING SHINGLE published on Apr. 21, 2005 which describes a non-imaging, non-tracking, integrally-formed solar radiation concentrator that passively concentrates both diffuse and direct solar radiation onto photovoltaic cells to produce electricity, incorporating its features into a shingle-like element useful as a roofing material and in other structural applications.
- U.S. Patent Application Publication US 2009/0078303 with inventor Thomas Brezoczky, et. al. for ENCAPSULATED PHOTOVOLTAIC DEVICE USED WITH A REFLECTOR AND A METHOD OF USE published on Sep. 22, 2008 which describes an apparatus that has photovoltaic modules and a concentrator mechanically attached to a frame.

While each of the prior art methodologies has its particular application, the general problem of providing an inexpensive and modular solar energy collection system has not been addressed by the prior art.

Deficiencies in the Prior Art

The prior art suffers from several deficiencies, including but not limited to lack of low profile, lack of modularity, need for mechanized placement for efficient solar tracking, non-passive orientation requirements, high cost, and lack of modularity.

OBJECTIVES OF THE INVENTION

Accordingly, the objectives of the present invention are (among others) to circumvent the deficiencies in the prior art and affect the following objectives:
(1) Provide for a modular solar collector system that is cost effective as compared to the prior art.
(2) Provide for a modular solar collector system that is easily manufactured as compared to the prior art.
(3) Provide for a modular solar collector system that is has a low profile.
(4) Provide for a modular solar collector system that is may be oriented horizontally, vertically, or at some other angle with respect to the ground plane.

(5) Provide for a modular solar collector system that does not require mechanized placement for sun tracking.
(6) Provide for a modular solar collector system that is modular and extensible.
(7) Provide for a modular solar collector system that may be expanded in linear vectors and/or in array/planar arrays.
(8) Provide for a modular solar collector system that durable as compared to the prior art.
(9) Provide for a modular solar collector system that may be place in roadways, building roofs/exterior walls, and other exterior structures.

While these objectives should not be understood to limit the teachings of the present invention, in general these objectives are achieved in part or in whole by the disclosed invention that is discussed in the following sections. One skilled in the art will no doubt be able to select aspects of the present invention as disclosed to affect any combination of the objectives described above.

BRIEF SUMMARY OF THE INVENTION

Overview

The present invention context generally involves a number of Modular Solar Collector System (MSCS) and Modular Solar Collector Method (MSCM) embodiments. Generally speaking, the term MSCS will deal with the invention apparatus and the term MSCM will deal with the invention methods utilizing some MSCS embodiment.

The present invention incorporates a modular approach to the collection of solar radiation. The system generally comprises one or more (and in many cases a plethora) of solar/optical waveguides that both collect solar radiation and permit the energy associated with this radiation to be "piped" or channeled in linear vectors and/or array/planar arrays towards an energy sinking device.

System Summary (0100)

As generally illustrated in FIG. 1 (0100), the invention system can be generally described as a Modular Solar Collector System (MSCS) (0100) comprising a front top radiation injection port (0101), front face radiation input port (0102), and rear face radiation output port (0103), with solar collection summation (0104) occurring within the body of the device. The front top radiation injection port (0101) collects radiant solar energy from a variety of angles incident on the MSCS system (0100) from a solar radiation source (0111). This incident radiant solar energy is summed (0104) within the body of the device with that of a pass-thru radiation source (0112) input into the front face radiation input port (0102) and emitted at the rear face radiation output port (0103) to a solar radiation sink (0113). Optically reflective surfaces within the body of the MSCS system (0100) direct solar energy from the front top radiation injection port (0101) and the front face radiation input port (0102) to the rear face radiation output port (0103).

Method Summary (0200)

As generally illustrated in FIG. 2 (0200), the invention method can be generally described as a Modular Solar Collector Method (MSCM) (0200) comprising the following method steps:

(1) Injecting radiant solar energy into the front top radiation injection port of a modular solar collector system (MSCS) (0201);
(2) Inputting pass-thru solar energy into the front face radiation input port of the modular solar collector system (MSCS) (0202);
(3) Combining the radiant solar energy and the pass-thru solar energy to produce a summed solar energy result (0203);
(4) Transmitting the summed solar energy result to the rear face radiation output port of the modular solar collector system (MSCS) (0204);
(5) Processing the solar energy output from the rear face radiation output port of the modular solar collector system (MSCS) in an attached modular solar collector system (MSCS) or in a terminal solar application (0205).

One skilled in the art will recognize that these steps may be rearranged without detracting from the teachings of the present invention, and may be augmented with the previously disclosed system embodiments with no loss of generality in the teachings of the invention.

BRIEF DESCRIPTION OF THE DRAWINGS

For a fuller understanding of the advantages provided by the invention, reference should be made to the following detailed description together with the accompanying drawings wherein.

DESCRIPTION OF THE PRESENTLY PREFERRED EXEMPLARY EMBODIMENTS

Figure 1:
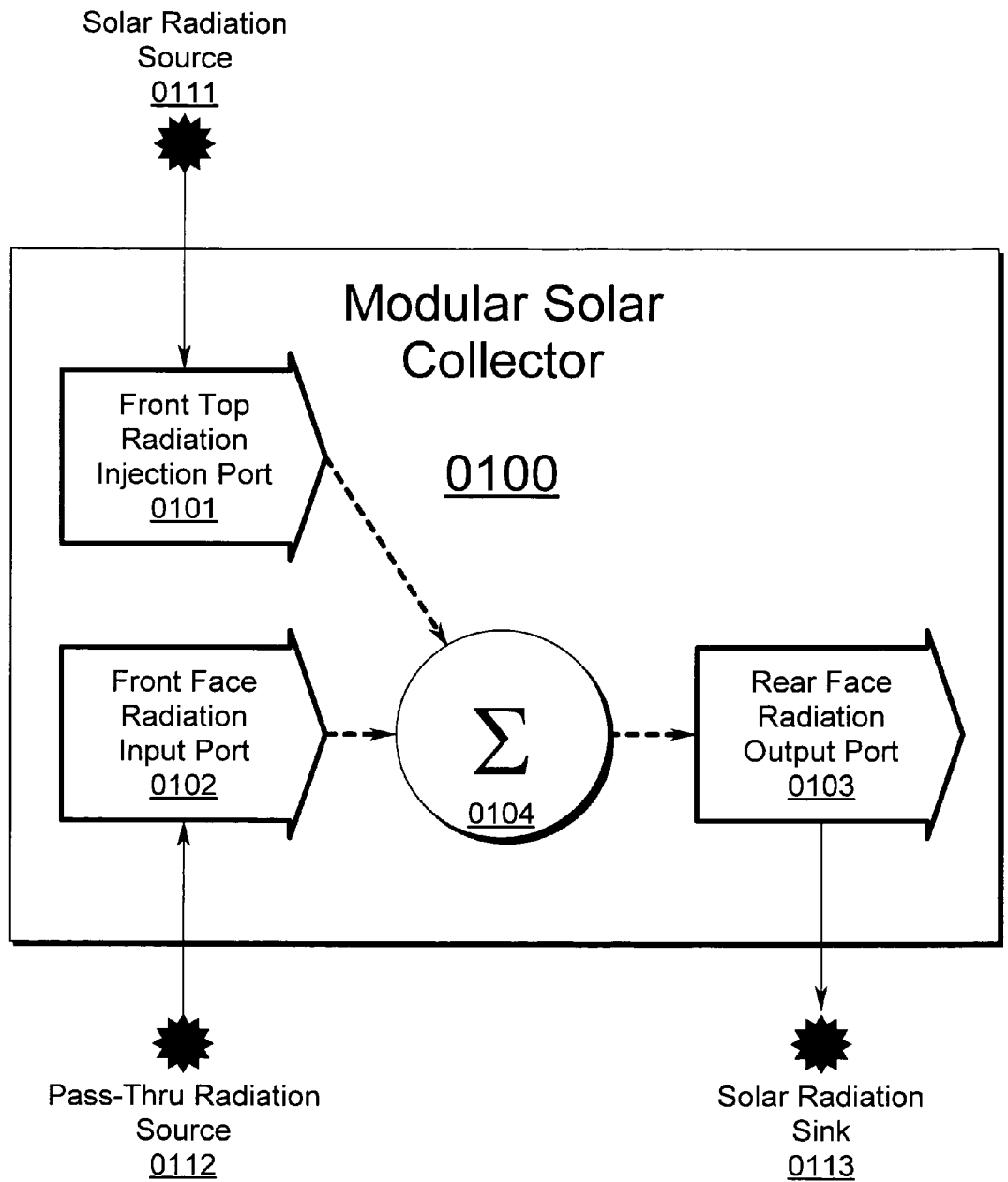
FIG. 1 illustrates a generalized function block diagram describing the present invention system.
Figure 2:
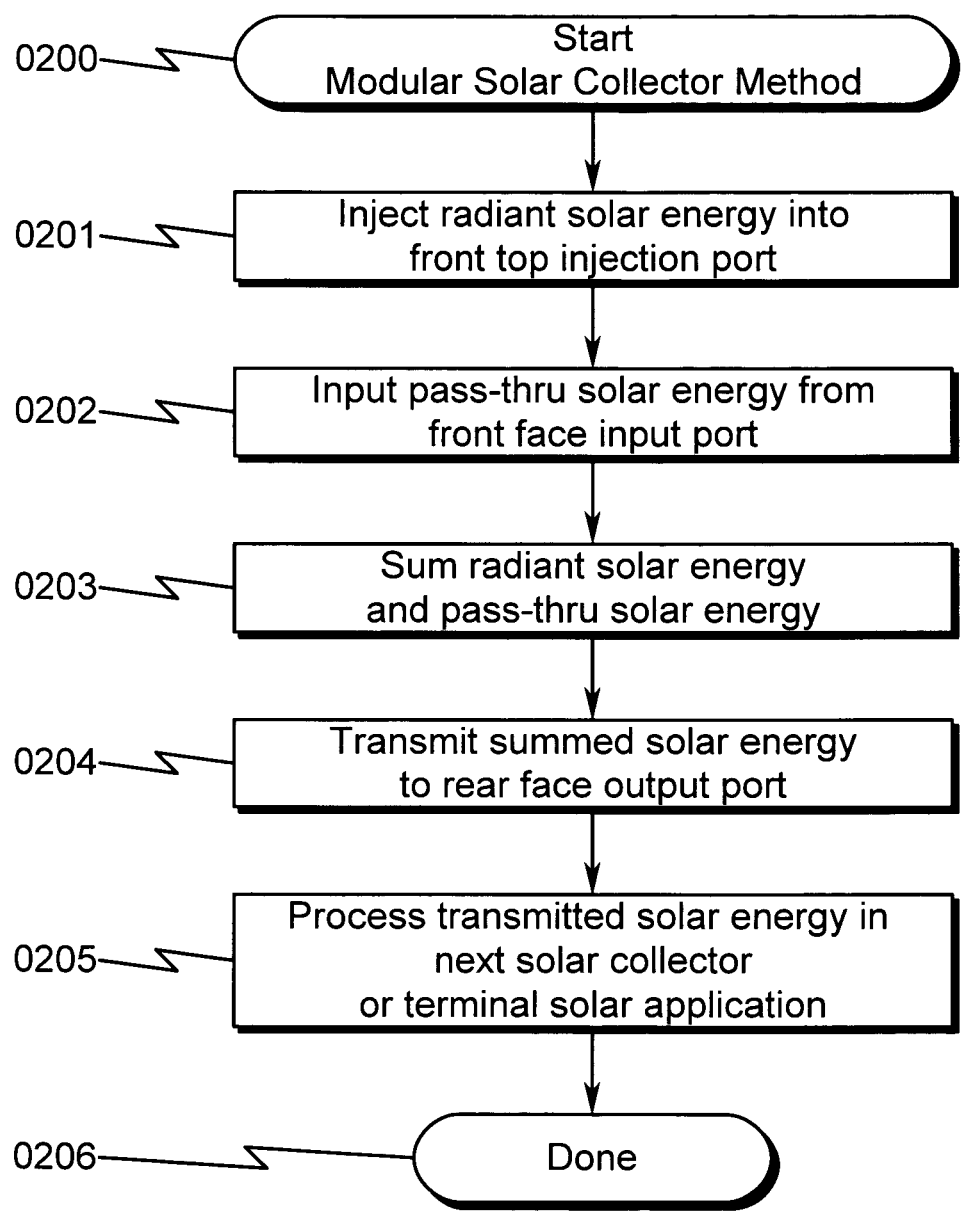
FIG. 2 illustrates a generalized function flowchart diagram describing the present invention method.

While this invention is susceptible of embodiment in many different forms, there is shown in the drawings and will herein be described in detailed preferred embodiment of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of a MODULAR SOLAR COLLECTOR SYSTEM AND METHOD. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

Materials not Limitive

The present invention may be constructed of a variety of materials, including but not limited to plastic, metal, wood, etc. The general construction illustrated herein is not intended to limit the scope of materials suitable for this application. Many preferred embodiments utilize glass (optimally low lead glass) and/or injection molded plastic for the solar/optical waveguide, but as previously discussed this invention element may be fabricated from a wide variety of radiation transmission materials. In addition to these variants, a wide variety of methodologies are anticipated to promote internal reflection of radiation within the waveguide structure to permit "piping" of the radiation input and radiation injection ports to the radiation output port. One skilled in the art will recognize that a wide variety of coatings, including multi-layer coatings, may be implemented to affect this reflective behavior.

Passive Structure not Limitive

While the present invention anticipates many embodiments will be implemented using a passive vector/array of solar/optical waveguides as taught herein, the present invention also anticipates in some circumstances a mechanical positioning system may augment the present invention to permit more optimal collection of solar radiation. Thus, the present invention is not limited to solely passive collection methodologies as shown herein.

Vector/Array Structure not Limitive

References within this document to "vectors"/"linear vectors" and/or "arrays"/"planar arrays" should be construed to include non-linear curves and curved surfaces.

Reflective Waveguide Surface not Limitive

The present invention specifically anticipates the use of aluminized surface coatings for the solar/optical radiation waveguide surfaces that do not comprise the radiation input, radiation injection, and radiation output ports. While there are many methodologies that may be utilized to implement this surface coating, one preferred method is to coat the waveguide structure when it initially formed in the case of plastic and/or glass configurations.

However, it should be noted that the present invention specifically anticipates the use of substrate and/or surface doping to affect the necessary refractive properties of the waveguide material. Those skilled in the art will recognize that the use of the Doctrine of Equivalents as spelled out in the *Corning Glass Works* v. *Sumitomo Electric U.S.A., Inc.* 868 F.2d 1251, 9 U.SP.Q.2d 1962 (Fed. Cir. 1989) patent infringement case identifies two methods of providing for efficient transmission through an optical waveguide. These involve doping the core of the substrate and then cladding the core with a material doped to a different level, or, alternatively, adding a negative dopant to the cladding of the substrate. The present invention specifically anticipates that either of these methods may be utilized in various embodiments of the MSCS to enhance the transmission properties of the waveguide. While the present invention anticipates the use of doping and/or anti-doping techniques as described within this court case and well known to those skilled in the art, the present invention is not necessarily limited to the specific aspects of the dopants as described in this infringement action.

Input/Output Port Relation to Bottom Surface not Limitive

The present invention anticipates that the input port and output port are configured to be substantially perpendicular to the bottom surface of the solar/optical waveguide. In some situations it may be advantageous to have one or more of the input/output ports to be at a slight angle departing from strict perpendicularity to the bottom surface. This departure in one or more of these ports may be used to advantage in transmitting solar radiation from one solar/optical waveguide to the next solar/optical waveguide in a linear vector and/or array/planar array. Note that if the vector of solar/optical waveguides is configured so that the bottom surfaces are not residing in a common plane, modification of the angles of the input and/or output ports with respect to the respective bottom surfaces may be utilized to more efficiently transmit solar radiation from one solar/optical waveguide to a successive solar/optical waveguide in a given vector.

Overview (0300, 0400, 0500, 0600, 0700)

Figure 3:
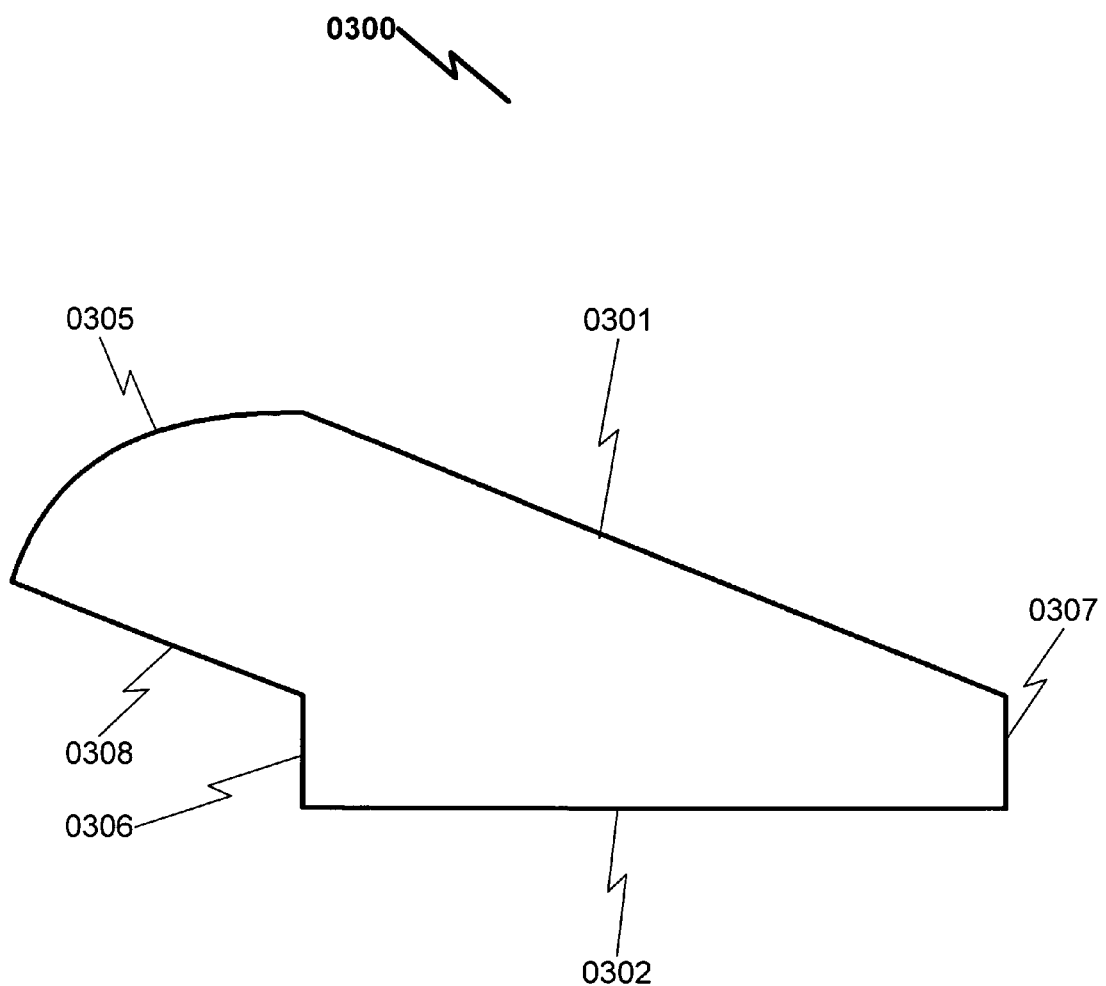
FIG. 3 illustrates a side profile view of a preferred exemplary embodiment of the present invention.
Figure 4:
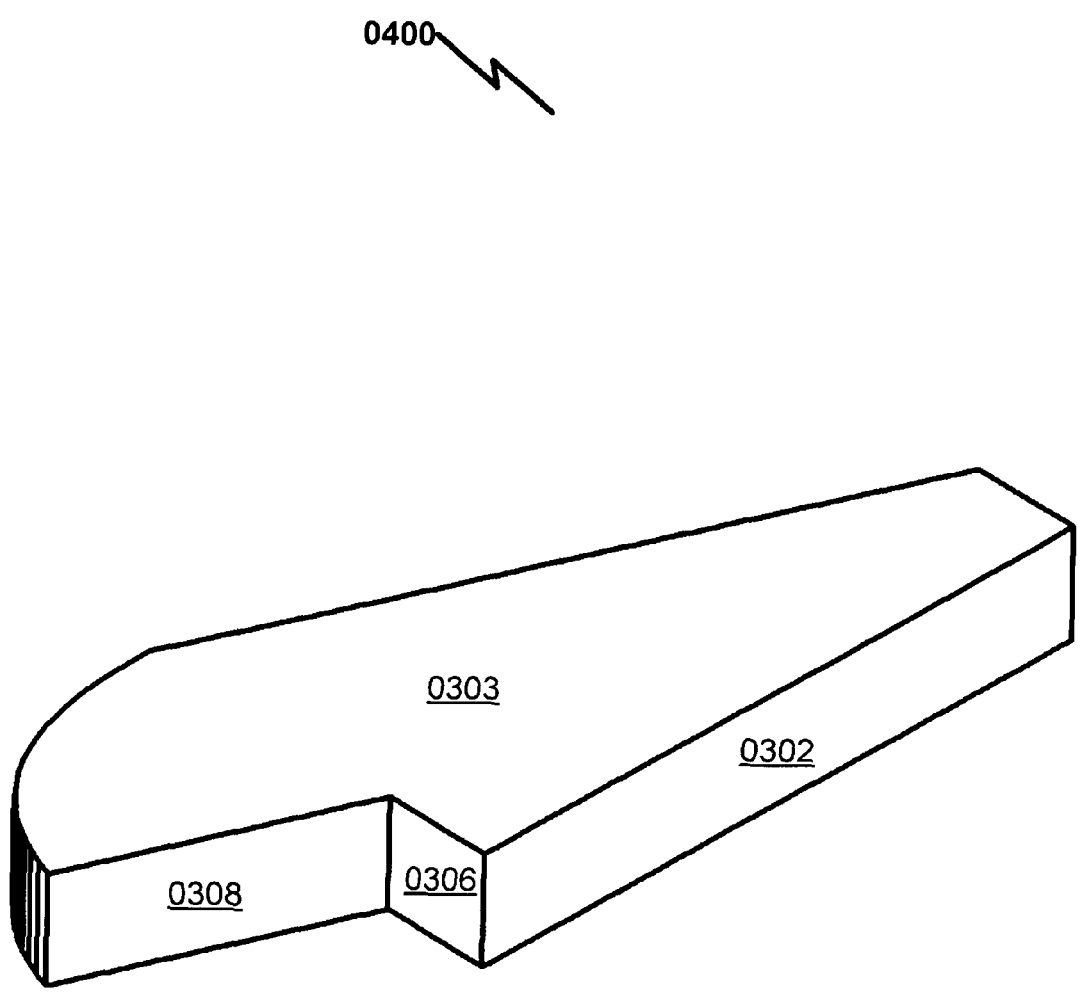
FIG. 4 illustrates an isometric view of a preferred exemplary embodiment of the present invention.
Figure 5:
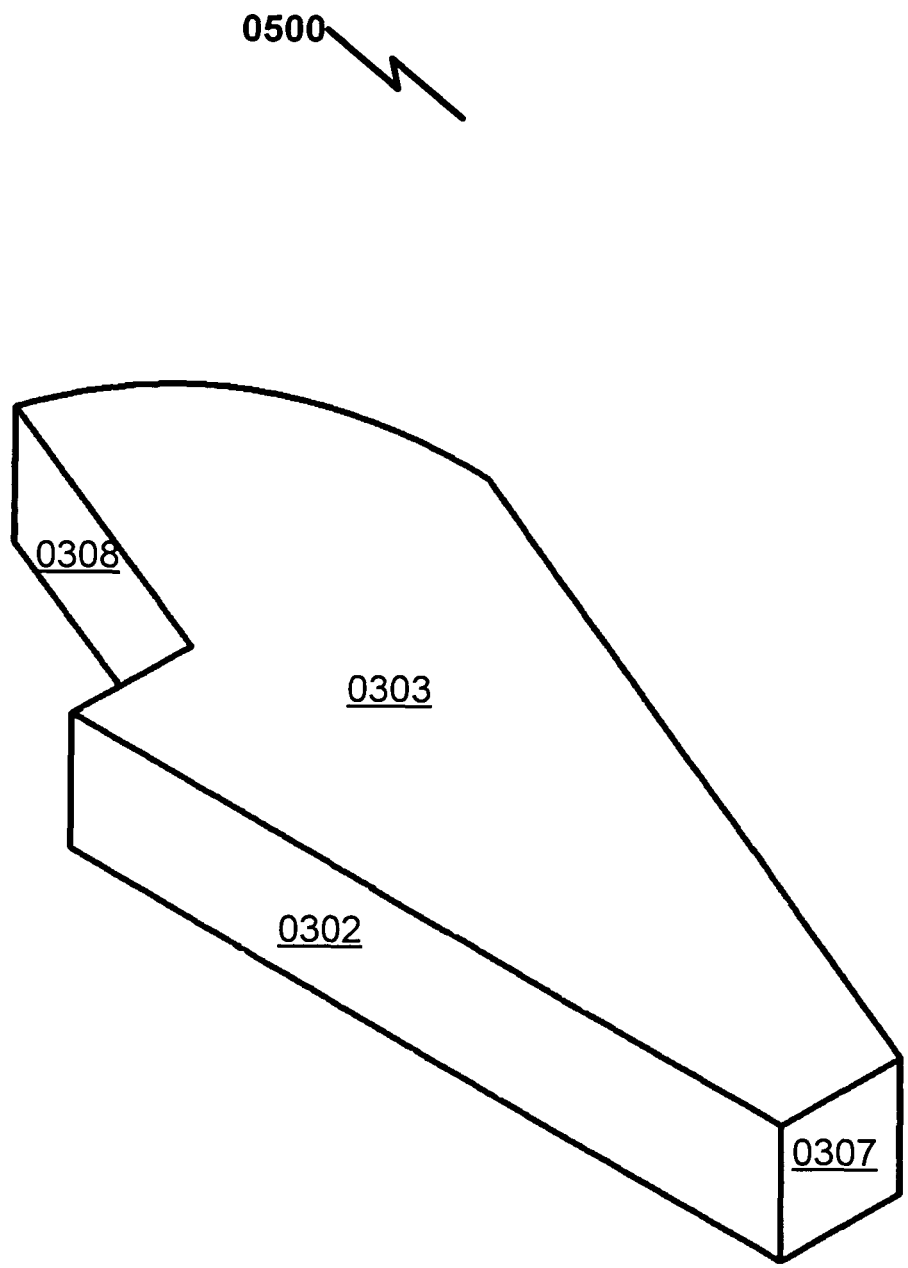
FIG. 5 illustrates an isometric view of a preferred exemplary embodiment of the present invention.
Figure 6:
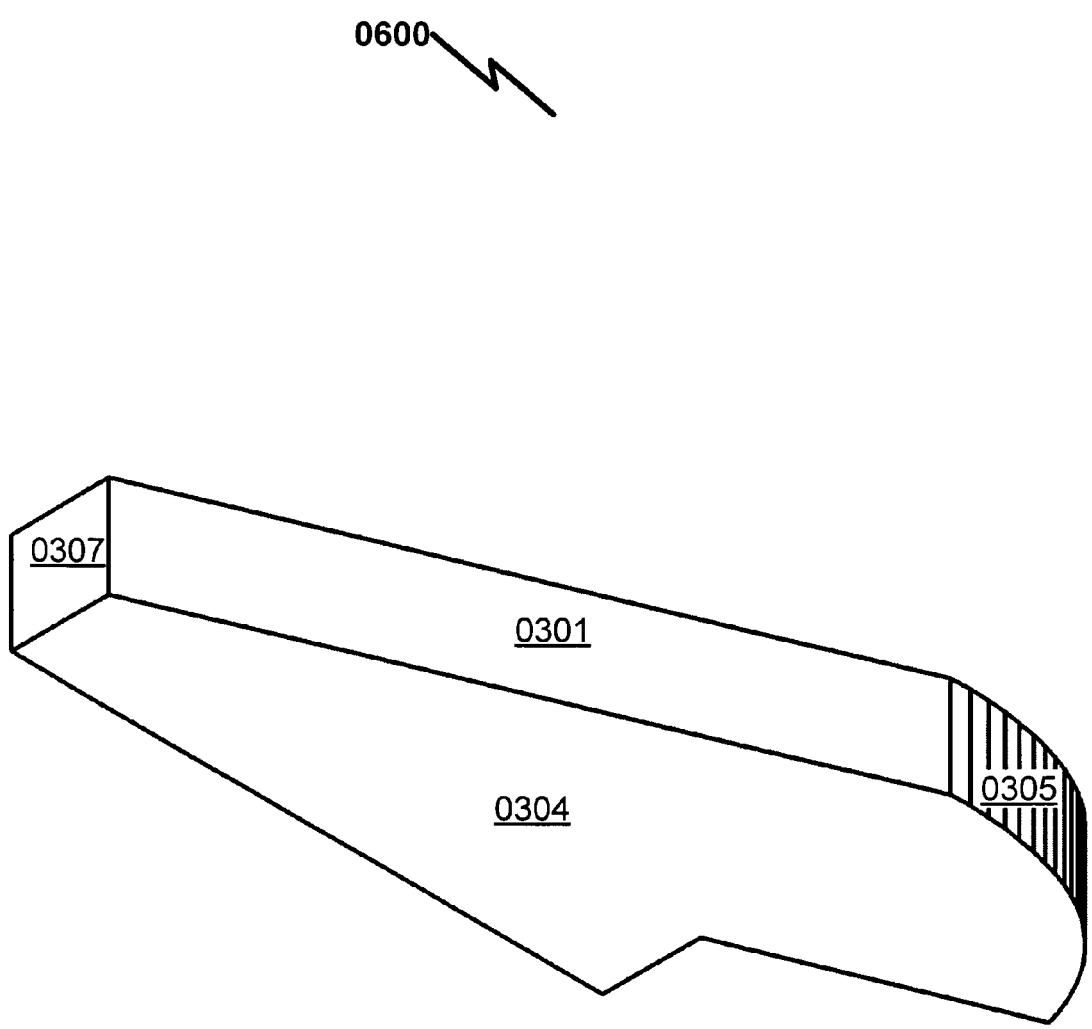
FIG. 6 illustrates an isometric view of a preferred exemplary embodiment of the present invention.
Figure 7:
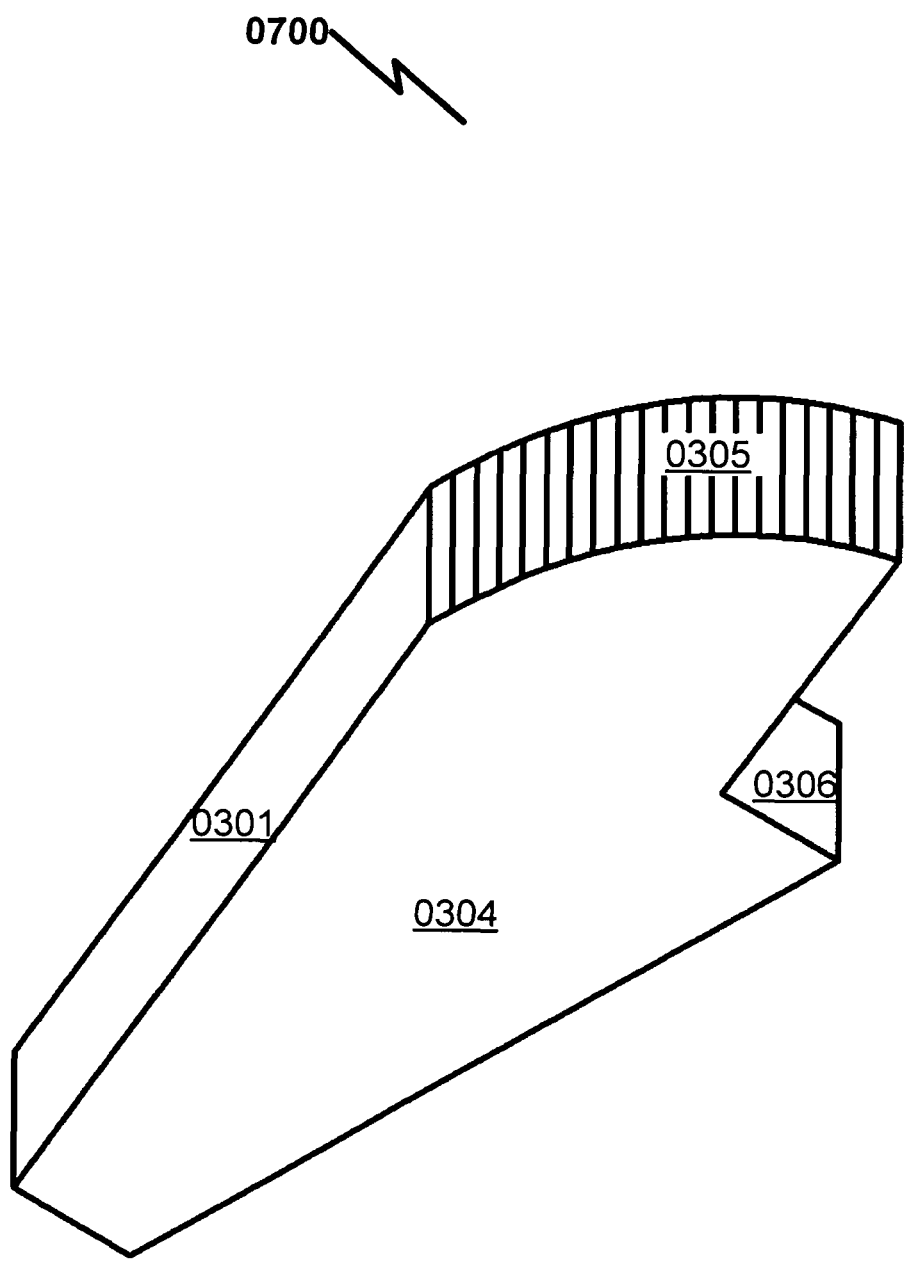
FIG. 7 illustrates an isometric view of a preferred exemplary embodiment of the present invention.

The modular solar collector system generally comprises one or more solar/optical radiation waveguide structures (as generally illustrated in the side profile view of FIG. 3 (0300), isometric views of FIG. 4 (0400), FIG. 5 (0500), FIG. 6 (0600), and FIG. 7 (0700)) comprises a waveguide body having the following elements:
(a) top surface (0301);
(b) bottom surface (0302);
(c) left side surface (0303);
(d) right side surface (0304);
(e) front top injection port surface (0305);
(f) front face input port surface (0306);
(g) rear face output port surface (0307); and
(h) bottom injection/input interface surface (0308);
This structure has the following characteristics:
the bottom surface (0302) is substantially rectangular and substantially flat;
the front face input port surface (0306) is substantially rectangular and substantially perpendicular to the bottom surface;
the rear face output port surface (0307) is substantially rectangular and substantially perpendicular to the bottom surface;
the left side surface (0303) is substantially perpendicular to the bottom surface;
the right side surface (0304) is substantially perpendicular to the bottom surface;
the top surface (0301) has a substantially rectangular perimeter and is not parallel to the bottom surface (0302);
the bottom injection/input interface surface (0308) has a substantially rectangular perimeter and is not parallel to the bottom surface (0302);
the rear face output port surface (0306) contacts the top surface (0301), the bottom surface (0302), the left side surface (0303), and the right side surface (0304);
the front top injection port surface (0305) connects the top surface (0301), the left side surface (0303), the right side surface (0304), and the bottom injection/input interface surface (0308);
the front top injection port surface (0305) curves from the top surface (0301) to the bottom injection/input interface surface (0308);
the bottom injection/input interface surface (0308) connects the front top injection port surface (0306), the left side surface (0303), the right side surface (0304), and the front face input surface (0306);
the top surface (0301), the bottom surface (0302), the left side surface (0303), and the right side surface (0304) reflect radiation scattered within the waveguide body.

This general solar/optical waveguide forms the basis for a number of system and method embodiments that make use of the "light pipe injection" principle that is taught by the present invention.

Transmissive/Reflective Surfaces (0800)

Figure 8:
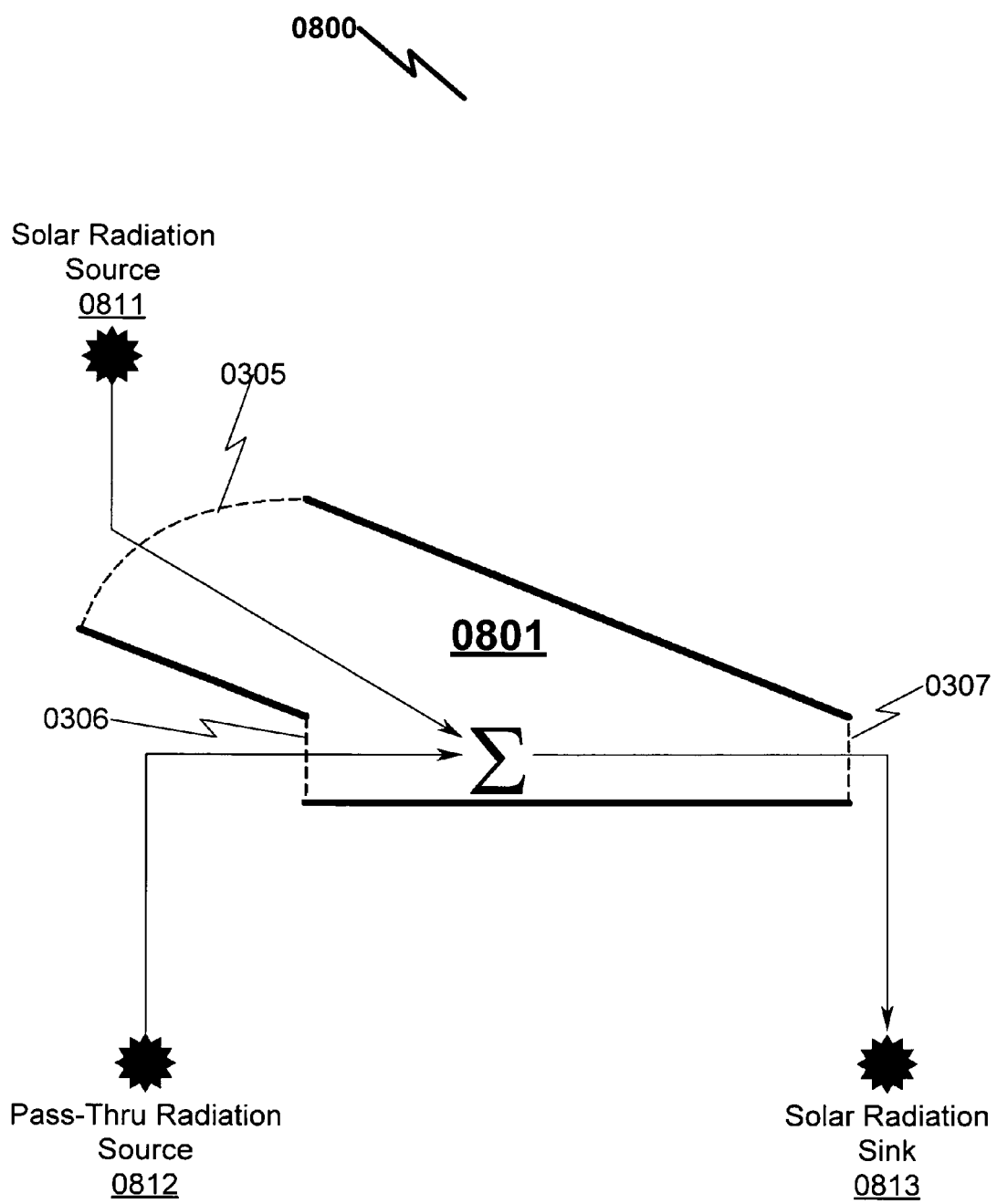
FIG. 8 illustrates a side sectional view of a preferred exemplary embodiment of the present invention detailing reflective surfaces within the interior of the exemplary solar/optical radiation waveguide body.

As generally illustrated in the side sectional view of FIG. 8 (0800), the present invention anticipates that the sides of the solar/optical radiation waveguide structure (0801) will generally have transmissive and reflective characteristics based on the function of the particular surface. As generally illustrated in this diagram (0800), the solid lines conforming to the top surface (0301), bottom surface (0302), left side surface (0303), right side surface (0304), and bottom injection/input interface surfaces (0308) all indicate reflective optical characteristics, whereas the dotted lines conforming to the front top injection port surface (0305), front face input port surface (0306), and rear face output port surfaces (0307) all indicate optically transmissive surfaces.

As indicated in this diagram (0800), the front top injection port surface (0305), front face input port surface (0306), and rear face output port surfaces (0307) are transmissive with respect to the solar radiation source (0811), pass-thru radiation source (0812), and solar radiation sink (0813) respectively. This configuration permits the remainder of the solar/optical radiation waveguide to act as a "radiation summation pipe" for the purposes of collecting and directing solar radiation to the solar radiation sink (0813).

Solar/Optical Waveguide Aspect Ratio (0900, 1000, 1100)

The exemplary solar/optical waveguides comprising the modular solar collection system as generally illustrated in FIG. 3-FIG. 8 (0300, 0400, 0500, 0600, 0700, 0800) may incorporate differing aspect ratios than that illustrated in these drawings without departing from the spirit of the disclosed invention. For example, various height aspect ratios are generally illustrated in the profile views of FIG. 9, FIG. 10, and FIG. 11, wherein tall (0900), medium (1000), and short (1100) aspect ratios are generally illustrated.

Figure 9:
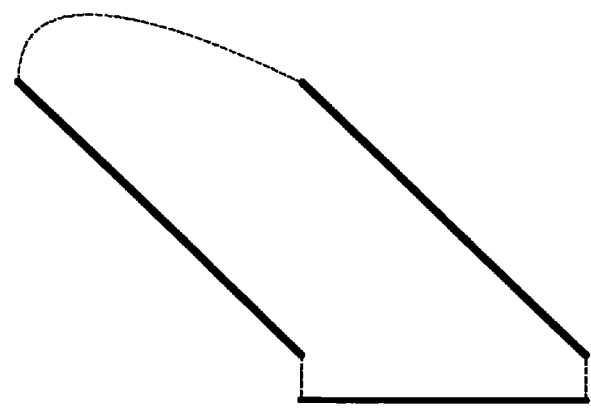
FIG. 9 illustrates side sectional and isometric views of preferred embodiments of the present invention with optional preferred exemplary modified aspect ratios.
Figure 9:
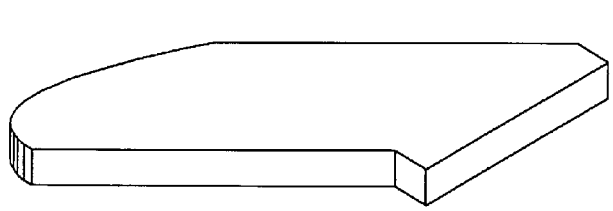
Figure 9:
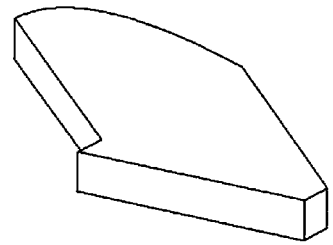
Figure 9:
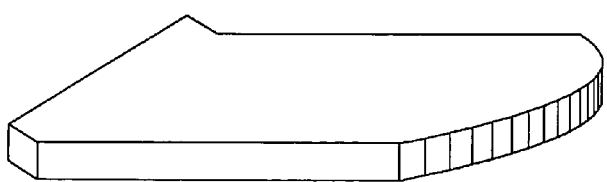
Figure 9:
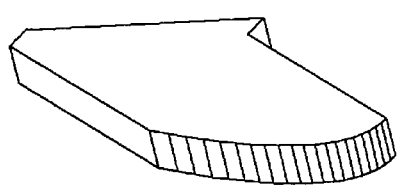
Figure 10:
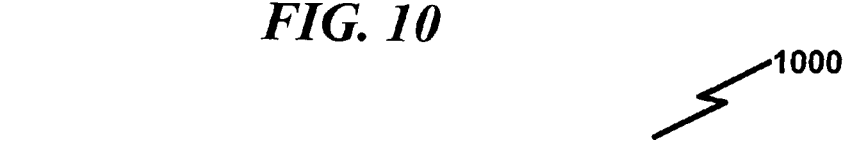
FIG. 10 illustrates side sectional and isometric views of preferred embodiments of the present invention with optional preferred exemplary modified aspect ratios.
Figure 10:
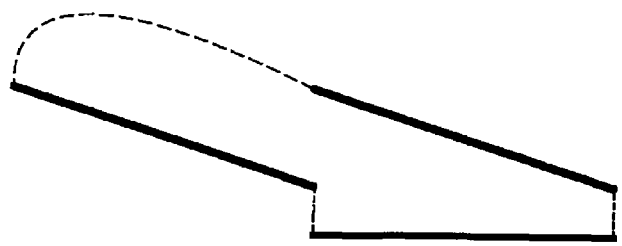
Figure 10:
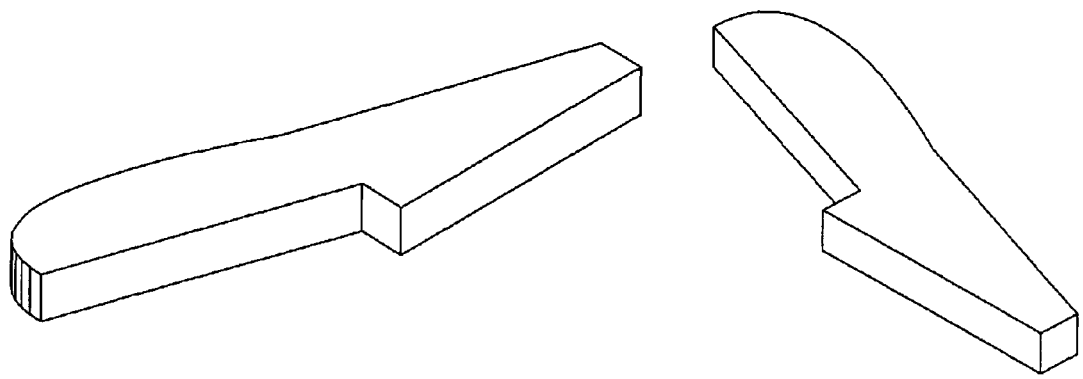
Figure 10:
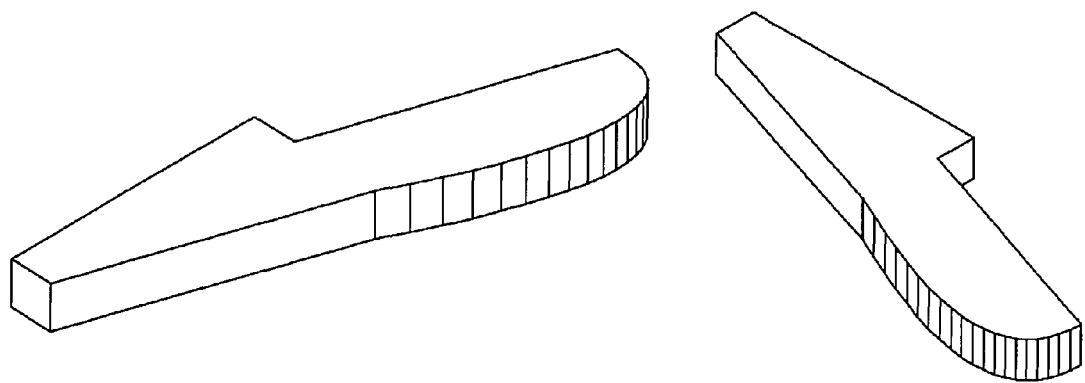
Figure 11:
FIG. 11 illustrates side sectional and isometric views of preferred embodiments of the present invention with optional preferred exemplary modified aspect ratios.
Figure 11:
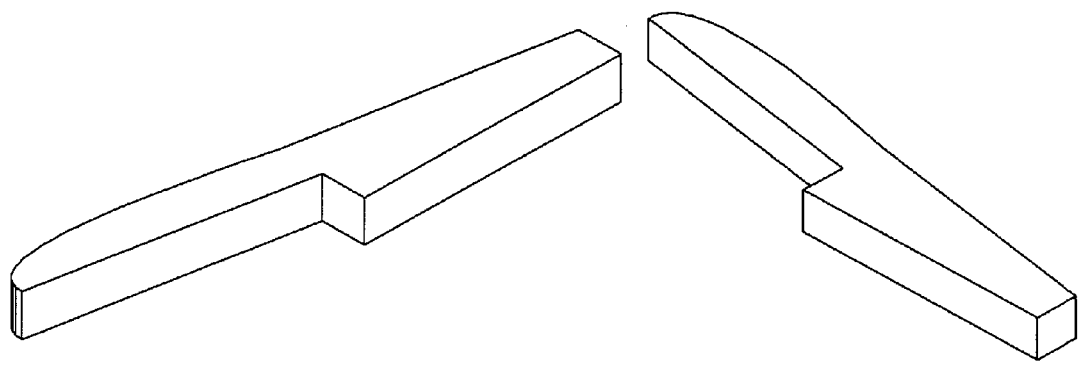
Figure 11:
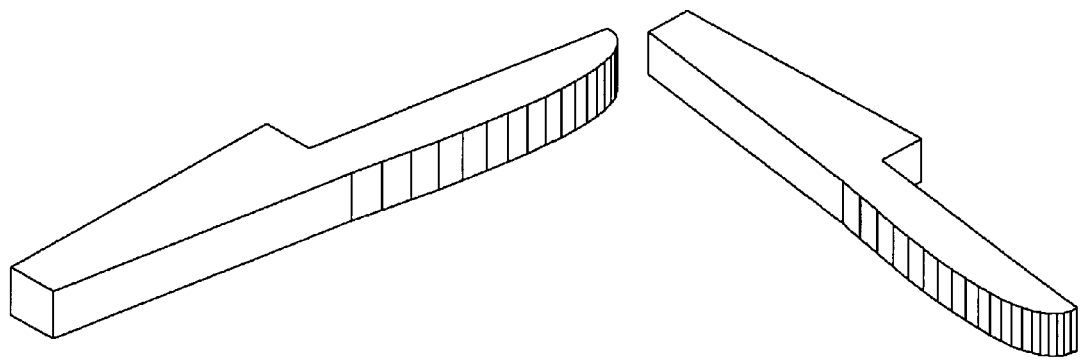

Note also in these exemplary embodiments that the horizontal ratio dimension of bottom surface (0302) to that of the bottom injection/input interface surface (0308) may be varied as illustrated. In FIG. 9, FIG. 10, and FIG. 11 (0900, 1000, 1100), the examples incorporate a ratio of approximately 1:1, wherein the exemplary embodiment generally illustrated in FIG. 3-FIG. 8 (0300, 0400, 0500, 0600, 0700, 0800) the ratio is approximately 12:5. The horizontal ratios illustrated in FIG. 9, FIG. 10, and FIG. 11 (0900, 1000, 1100) are thought to be optimal, as this ratio of 1:1 permits the entire surface of the exposed solar/optical radiation waveguide to capture ambient solar radiation, whereas in ratios greater than 1:1 some surface area of the exposed solar/optical radiation waveguide does not admit ambient solar radiation.

As illustrated in FIG. 9, FIG. 10, and FIG. 11 (0900, 1000, 1100), by symmetrizing the solar collection and reflector elements within the individual solar/optical radiation waveguides, maximum overlap of these elements within a vector or array of modular solar collector elements is achieved, resulting in optimal collection and direction of solar energy within the vector/array structure.

Input/Output Radiation Port Structures (1200, 1300, 1400)

While a generalized view of the solar/optical waveguide structure used within many preferred embodiments of the present invention has been illustrated in FIG. 3-FIG. 11 (0300, 0400, 0500, 0600, 0700, 0800, 0900, 1000, 1100), it should be noted that while the radiation input port and radiation output port are shown to have identical areas, some preferred embodiments of this structure may include an area disparity between these two structures.

Figure 12:
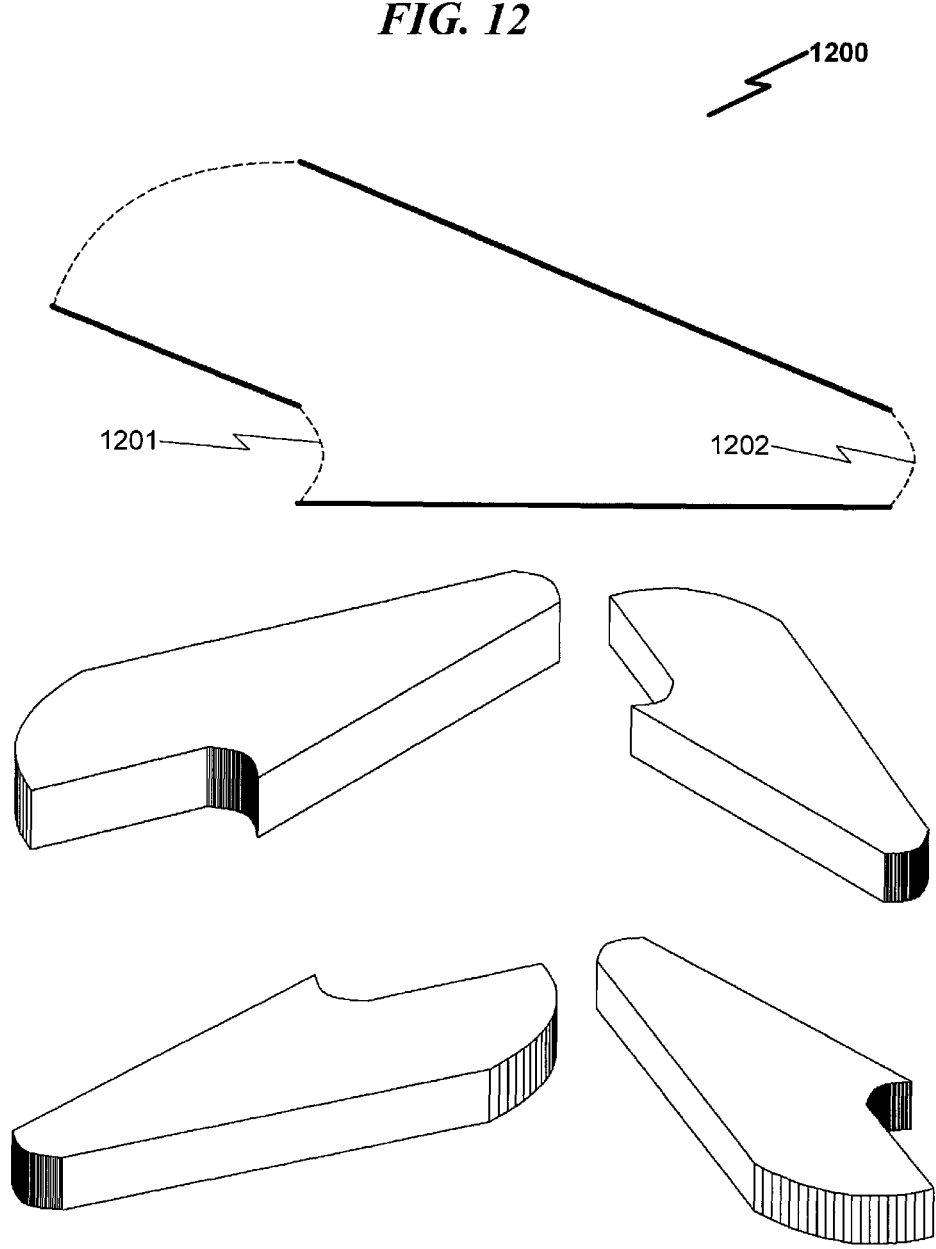
FIG. 12 illustrates side sectional and isometric views of preferred embodiments of the present invention detailing convex/concave structures associated with some preferred embodiments of the radiation input port and radiation output port respectively.

Additionally, as generally illustrated in the side profile and isometric views of FIG. 12 (1200), the radiation input port structure (1201) may include a slight concave surface feature to maximize radiation absorption from the radiation output port of the previous solar/optical waveguide. The radiation output port (1202) may also incorporate a corresponding slight convex surface feature to aid in this radiation transmission between adjacent SOW structures.

Figure 13:
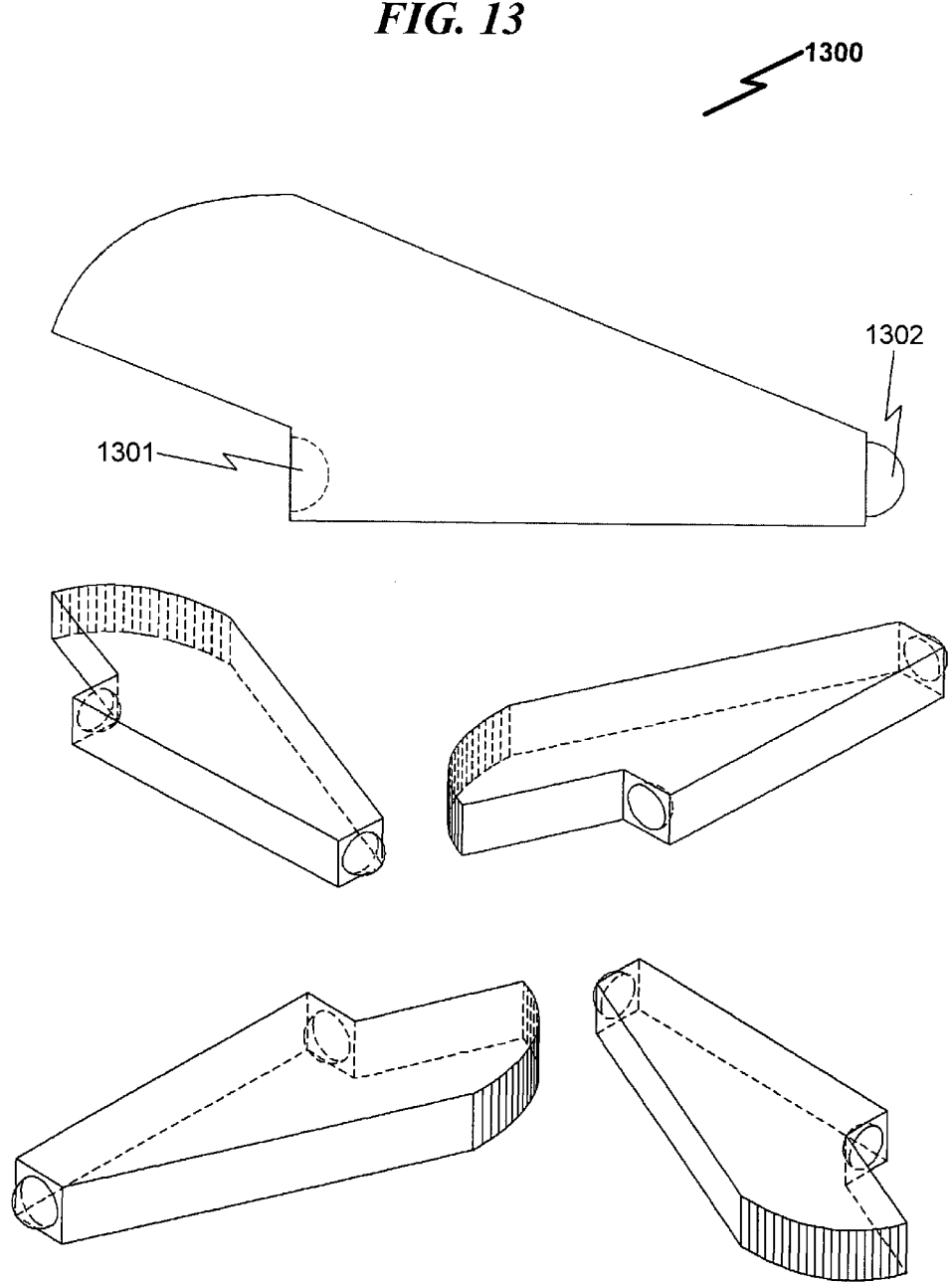
FIG. 13 illustrates side sectional and isometric views of preferred embodiments of the present invention detailing hemispherical lens structures associated with some preferred embodiments of the radiation input port and radiation output port respectively.
Figure 14:
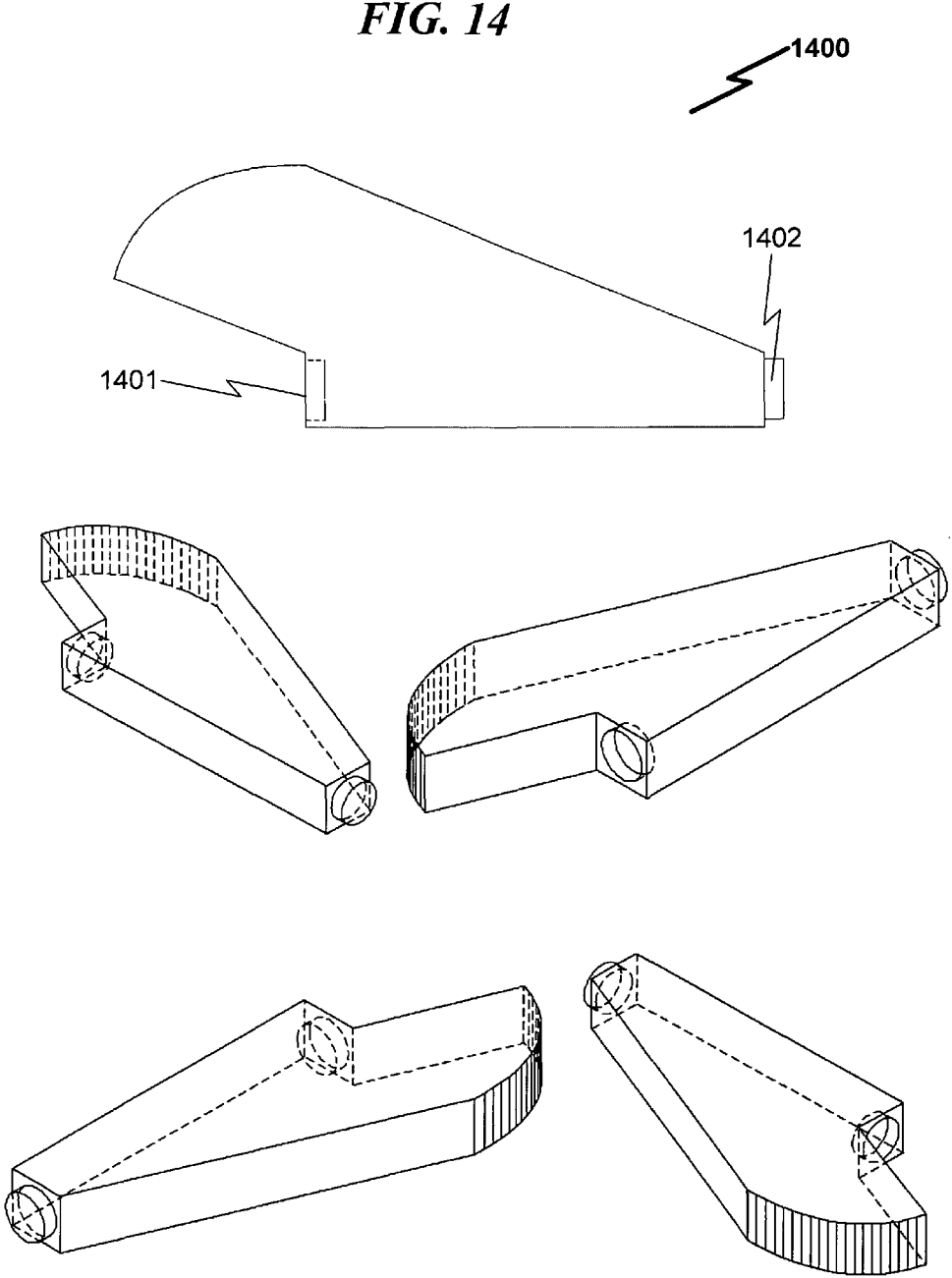
FIG. 14 illustrates side sectional and isometric views of preferred embodiments of the present invention detailing cylindrical lens structures associated with some preferred embodiments of the radiation input port and radiation output port respectively.

Finally, while the radiation input and output port structures may include a rectangular or square face in many embodiments, a cylindrical, conical, curved, and/or hemispherical output structure is also anticipated, as generally illustrated in the side profile and isometric views of FIG. 13 (1300) and FIG. 14 (1400). It is anticipated that the lens structure (1301, 1302, 1401, 1402) illustrated in these particular embodiments may be optimal in many circumstances, as it concentrates the summed solar radiation internal to the waveguide structure and focuses this to the output radiation port for acceptance into the adjacent SOW input radiation port. One skilled in the art will recognize that other input/output radiation port lens structures may be utilized in this configuration with no loss of generality in the teachings of the present invention.

Top Surface Structure Variant (1500)

Figure 15:
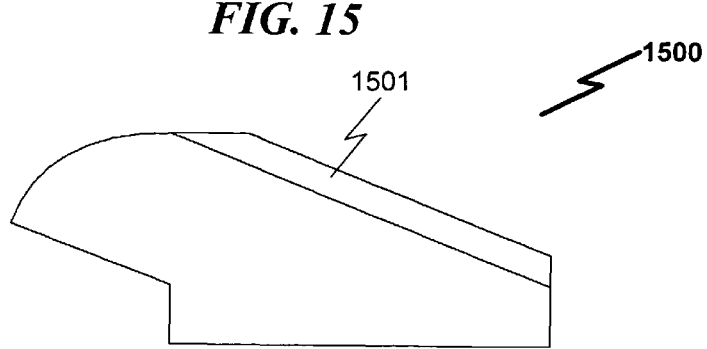
FIG. 15 illustrates side sectional and isometric views of a preferred embodiment of the present invention detailing a convex curved top surface.
Figure 15:
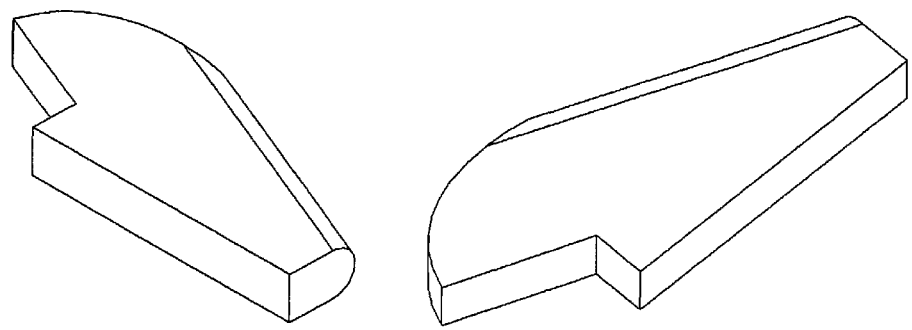
Figure 15:
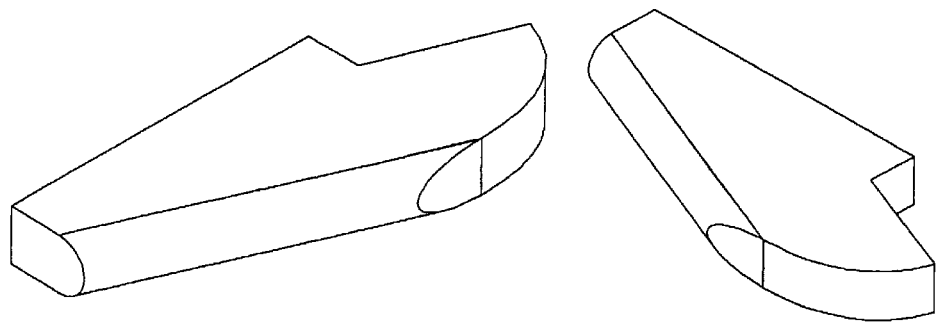

As generally illustrated in FIG. 15 (1500), the present invention anticipates a wide variety of construction variants, some of which may incorporate a convex curved top surface (1501). The top surface curvature may have many forms that generally extend from the left side surface to the right side surface, some of which may be semi-circular in nature. This modification to the general solar/optical radiation waveguide (SOW) structure may be utilized in some variants to promote internal reflection of the injected and transmitted solar radiation to the output radiation port.

Front Top Injection Port Surface Structure Variant (1600)

Figure 16:
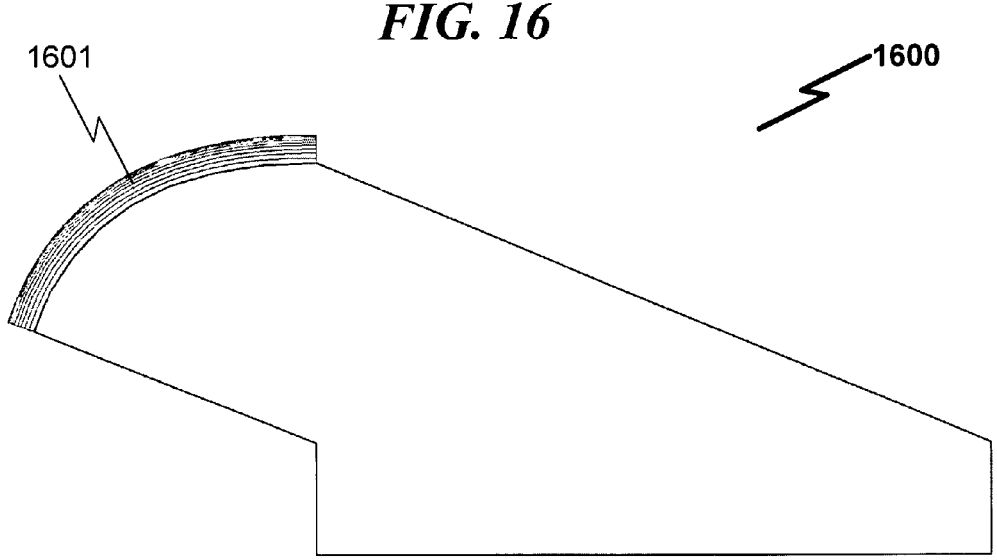
FIG. 16 illustrates side sectional and isometric views of a preferred embodiment of the present invention detailing a convex curved front top injection port surface.
Figure 16:
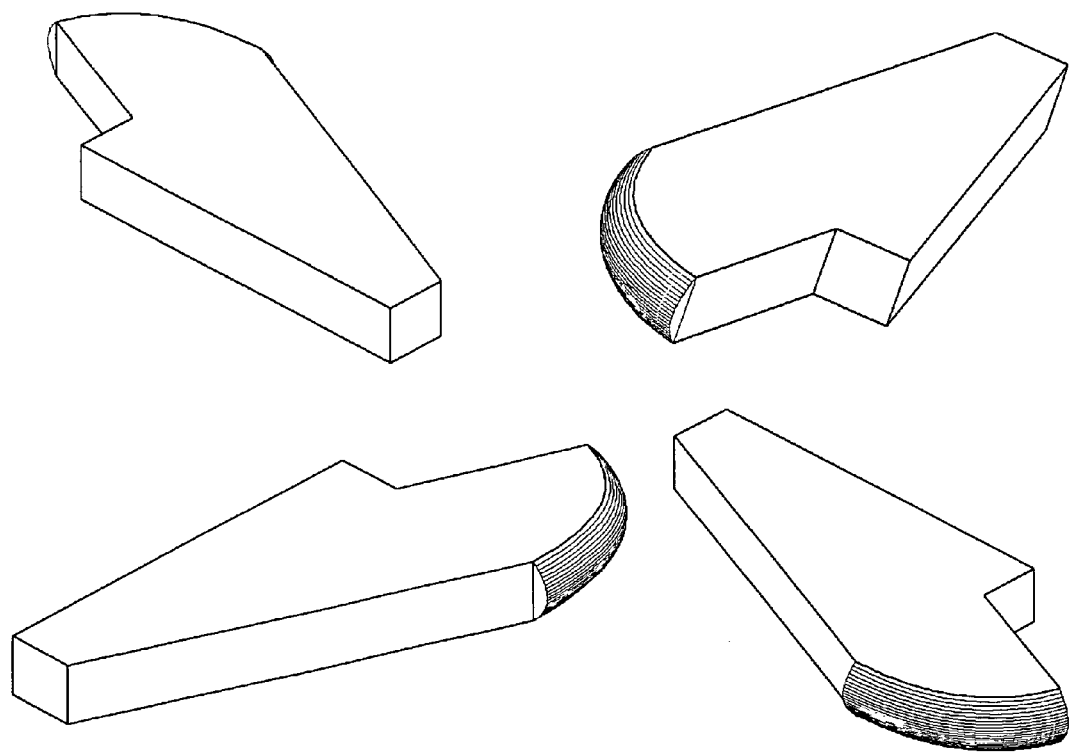

As generally illustrated in FIG. 16 (1600), the present invention anticipates a wide variety of construction variants, some of which may incorporate a convex curved front top injection port surface (1601). The front top injection port surface curvature may have many forms that generally extend from the left side surface to the right side surface, some of which may be semi-circular in nature. This modification to the general solar/optical radiation waveguide (SOW) structure may be utilized in some variants to promote enhanced collection of solar energy by providing a wider range of incident radiation angles that inject solar energy into the body of the SOW. This variation may be combined with the variant illustrated in FIG. 15 (1500) in some preferred embodiments.

Solar/Optical Waveguide Radiation Summation (1700)

Figure 17:
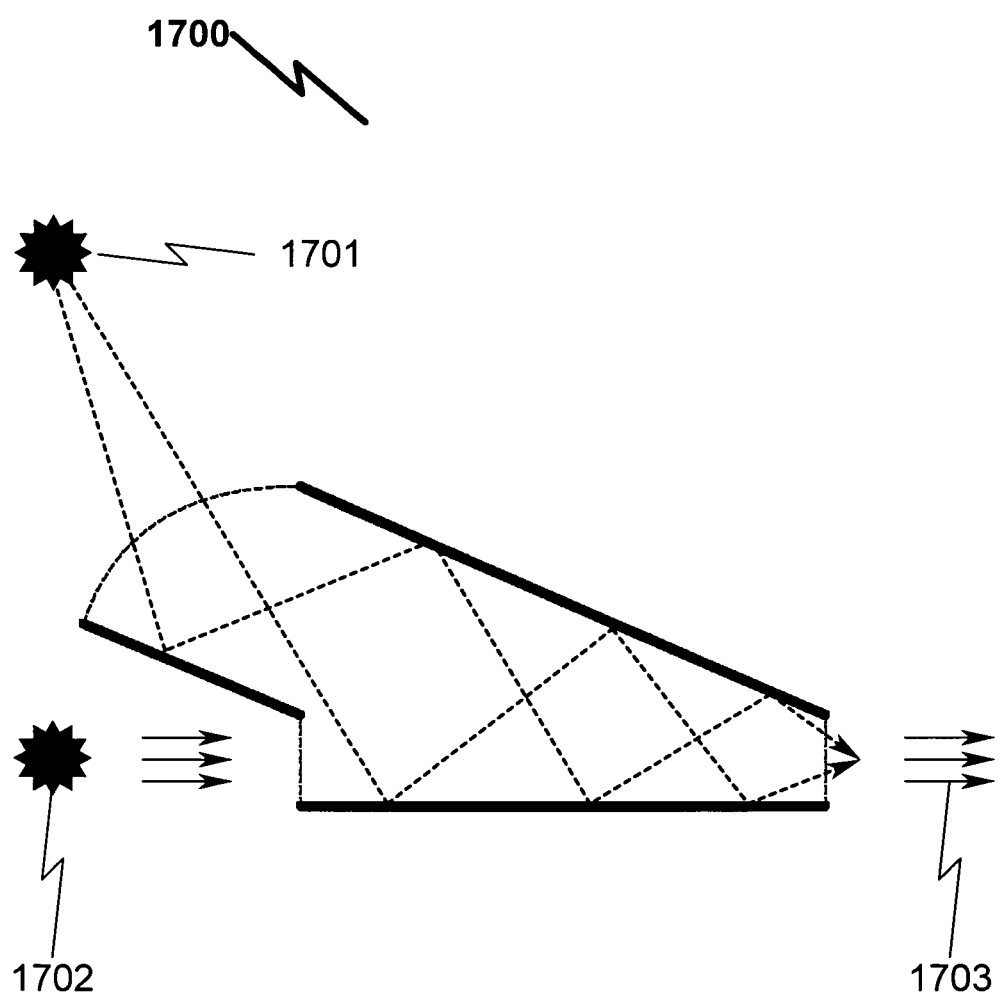
FIG. 17 illustrates a preferred exemplary embodiment of the present invention illustrating the radiation combining attributes of the solar/optical waveguide structure.

As generally illustrated in FIG. 17 (1700), the present invention utilizes a specially formed solar/optical radiation waveguide (SOW) that has the capability of combining incident solar radiation (1701) with solar radiation transmitted from other solar/optical waveguides (1702) and transmitting the summation radiation (1703) to a common output port. This configuration permits the solar/optical waveguides to be cascaded in a modular fashion to collect solar radiation over a large surface area.

Principle of Operation

Light Pipe Injection (1800)

Figure 18:
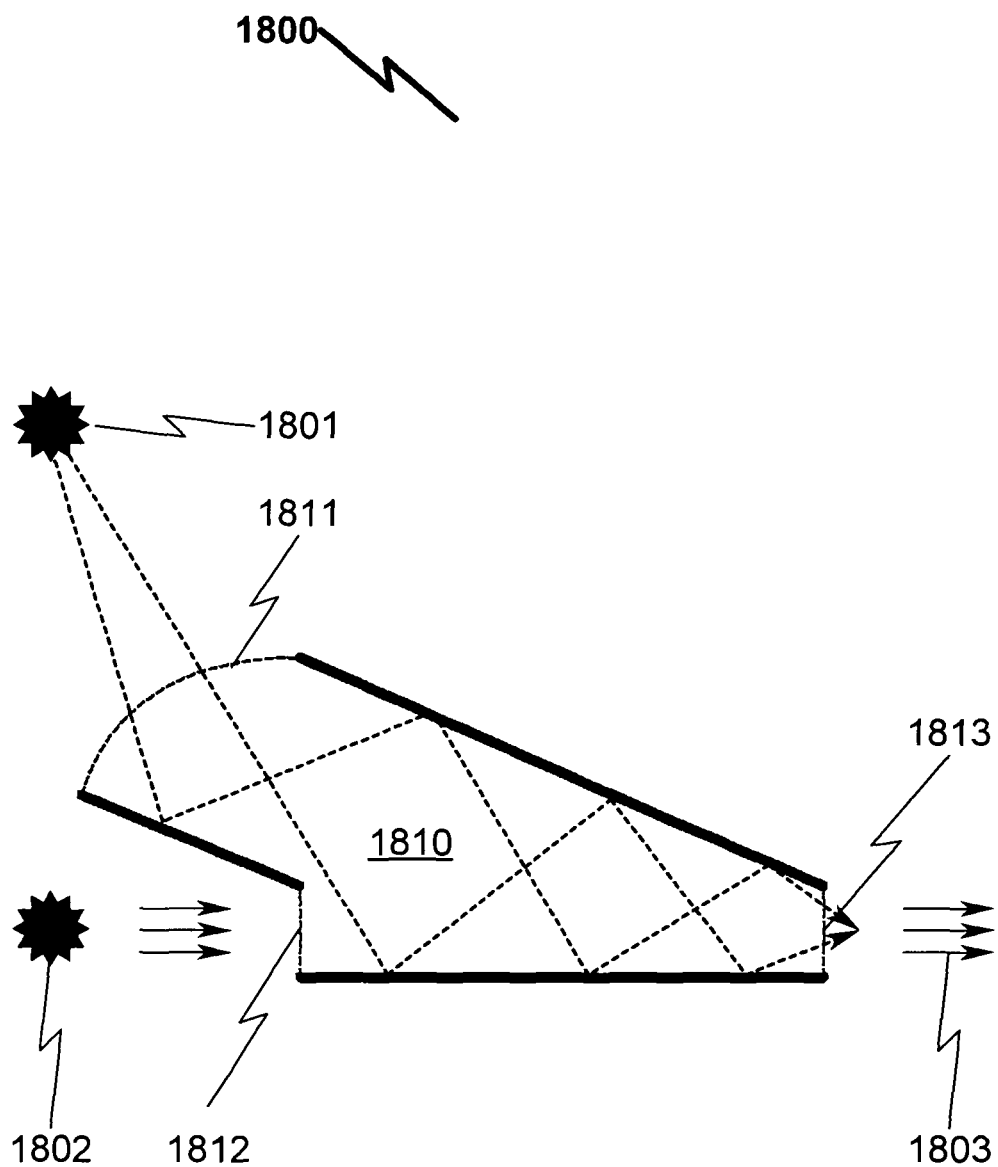
FIG. 18 illustrates a side view of a preferred exemplary embodiment of the present invention illustrating the "light pipe injection" principle taught by the present invention.

The present invention teaches several principles with respect to the collection of solar radiation. One of these principles, "light pipe injection" is generally illustrated in FIG. 18 (1800), wherein solar radiation (1801) impinges and is injected into the solar/optical waveguide (1810) and is internally reflected by all surfaces within the waveguide with the exception of the radiation injection port (1811), radiation input port (1812), and radiation output port (1813). The curved formation of the radiation injection port (1811) permits collection of solar radiation (1801) over a wide variety of longitudinal and latitudinal positions of the sun (1801), and as such permits the system to operate as an efficient solar collector without the need for mechanical positioning mechanisms as taught by the prior art.

Principle of Operation

Light Pipe Transmission (1900)

Figure 19:
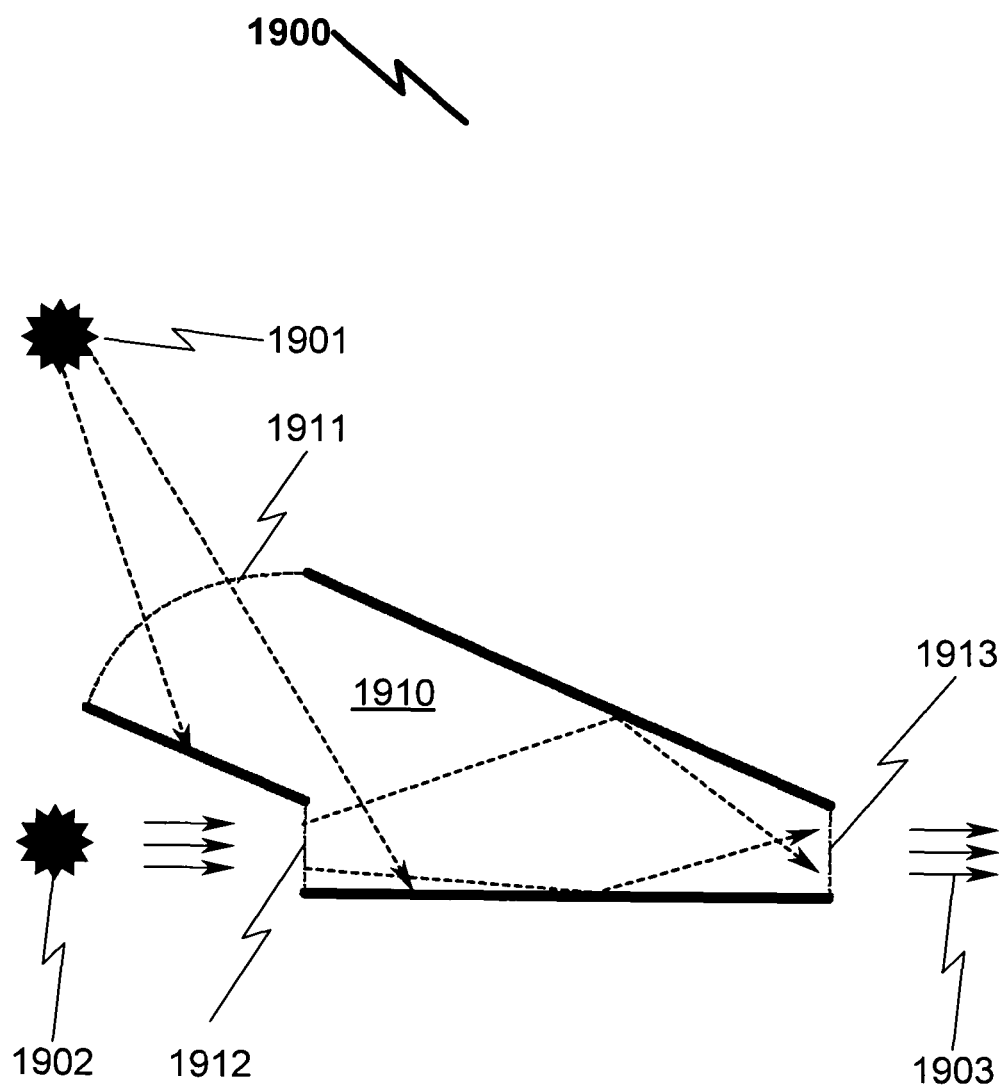
FIG. 19 illustrates a side view of a preferred exemplary embodiment of the present invention illustrating the "light pipe transmission" principle taught by the present invention.

The present invention teaches several principles with respect to the collection of solar radiation. One of these principles, "light pipe transmission" is generally illustrated in FIG. 19 (1900), wherein input radiation (1901) impinges the solar/optical waveguide (1910) and is internally reflected by all surfaces within the waveguide with the exception of the radiation injection port (1911), radiation input port (1912), and radiation output port (1913). The formation of the radiation input port (1912) permits transmission of impinging radiation (1902), thus permitting injection/transmission of radiation by other solar/optical waveguides to be collected and transmitted to follow-on solar/optical waveguides and/or terminal radiation collection devices.

Principle of Operation

Light Pipe Collection Vector (2000)

Figure 20:
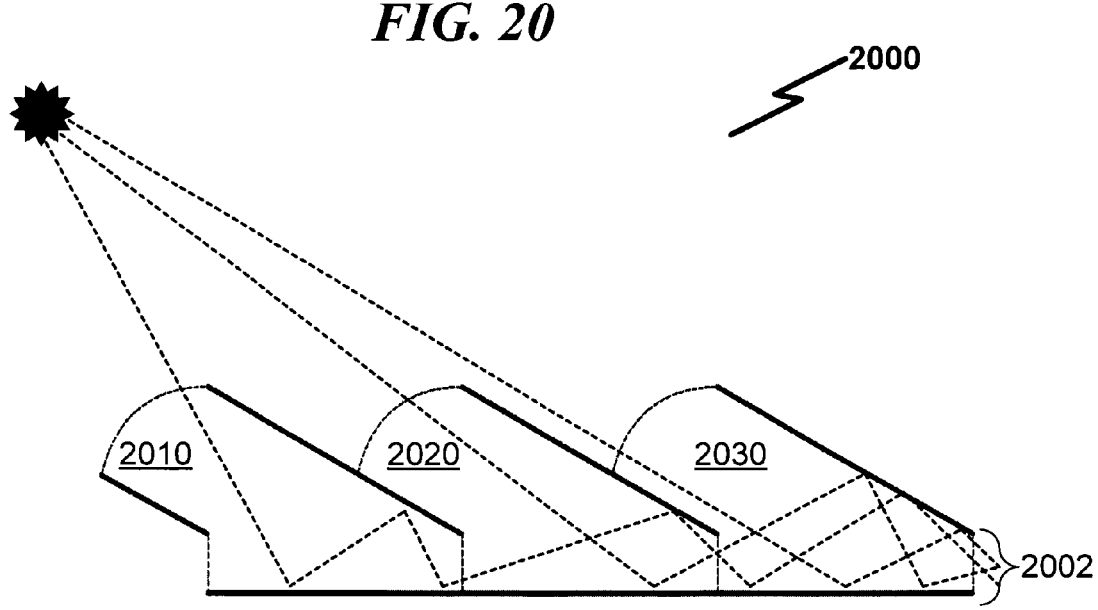
FIG. 20 illustrates side sectional and isometric views of a preferred exemplary embodiment of the present invention illustrating light pipe injection vectors.
Figure 20:
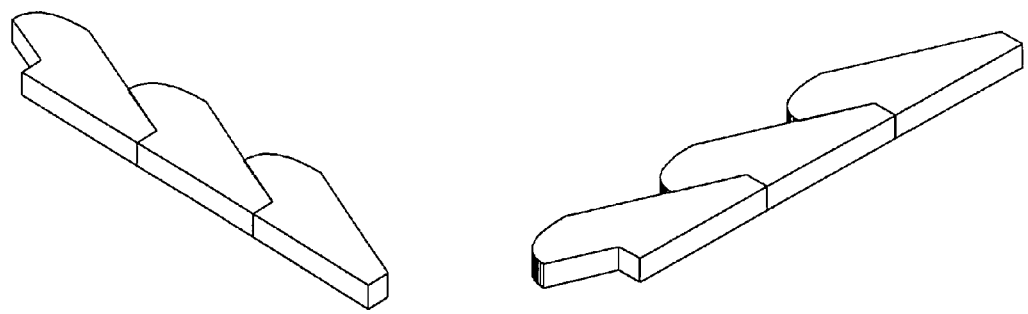
Figure 20:
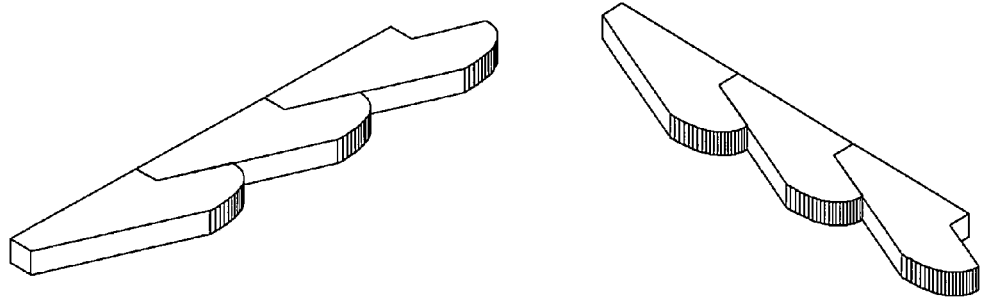

The present invention teaches several principles with respect to the collection of solar radiation. One of these principles, "light pipe collection vectors" is generally illustrated in FIG. 20 (2000), wherein multiple solar/optical waveguides (2010, 2020, 2030) are cascaded in a linear vector formation to permit injected solar radiation (2001) to be piped in a vector form to a common output port (2002).

While many preferred embodiments of the linear vectors will place the SOWs in proximal adjacency to one another, this is not a requirement of the present invention and may be dispensed with in some scenarios where the reference base of the bottom surface is non-planar. As mentioned previously, the term "linear vector" in this context should be broadly construed to include curves, as the base angular orientation of each individual SOWs may be modified slightly to achieve a curved line surface.

Principle of Operation

Light Pipe Collection Array (2100)

Figure 21:
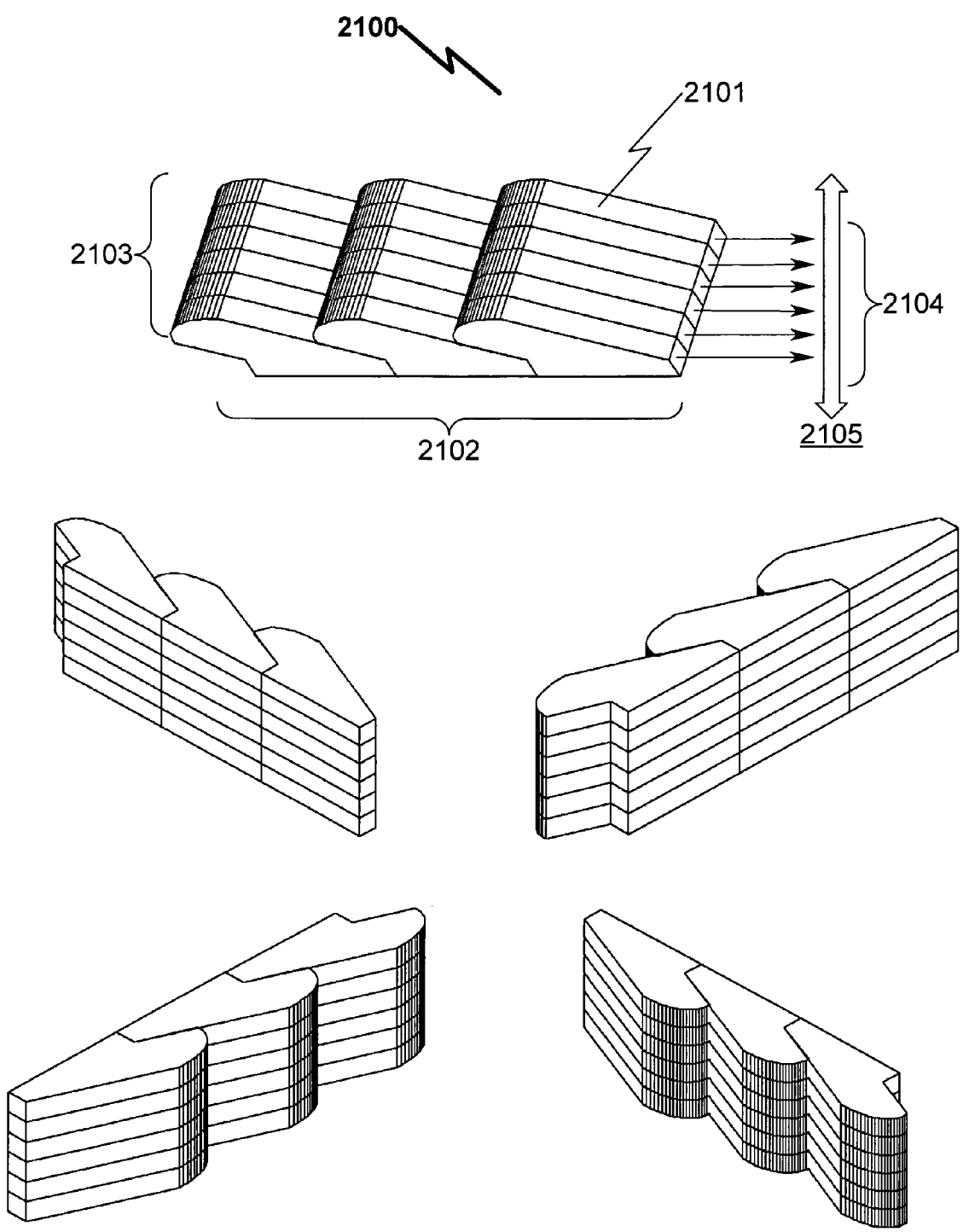
FIG. 21 illustrates side sectional and isometric views of a preferred exemplary embodiment of the present invention illustrating light pipe injection arrays.

The present invention teaches several principles with respect to the collection of solar radiation. One of these principles, "light pipe collection arrays" is generally illustrated in FIG. 21 (2100), wherein a plethora of solar/optical radiation waveguides (2101) are cascaded in adjacent multiple X-vector (2102) and Y-vector (2103) formation to permit injected solar radiation to be piped into an array form to a common output port (2104). This configuration permits a planar solar output collection point (2104) to transmit solar radiation to a linear output collector (2105) that may have many forms, including various forms of heat exchangers, passive lighting fixtures, water purification systems, etc.

While many preferred embodiments of the planar arrays will place the SOWs in proximal adjacency to one another, this is not a requirement of the present invention and may be dispensed with in some scenarios where the reference base of the bottom surface is non-planar. As mentioned previously, the term "planar array" in this context should be broadly construed to include curved surfaces, as the base angular orientation of each individual SOWs may be modified slightly to achieve a curved array surface.

Radiation Injection Port Surface Angles (2200)

Figure 22:
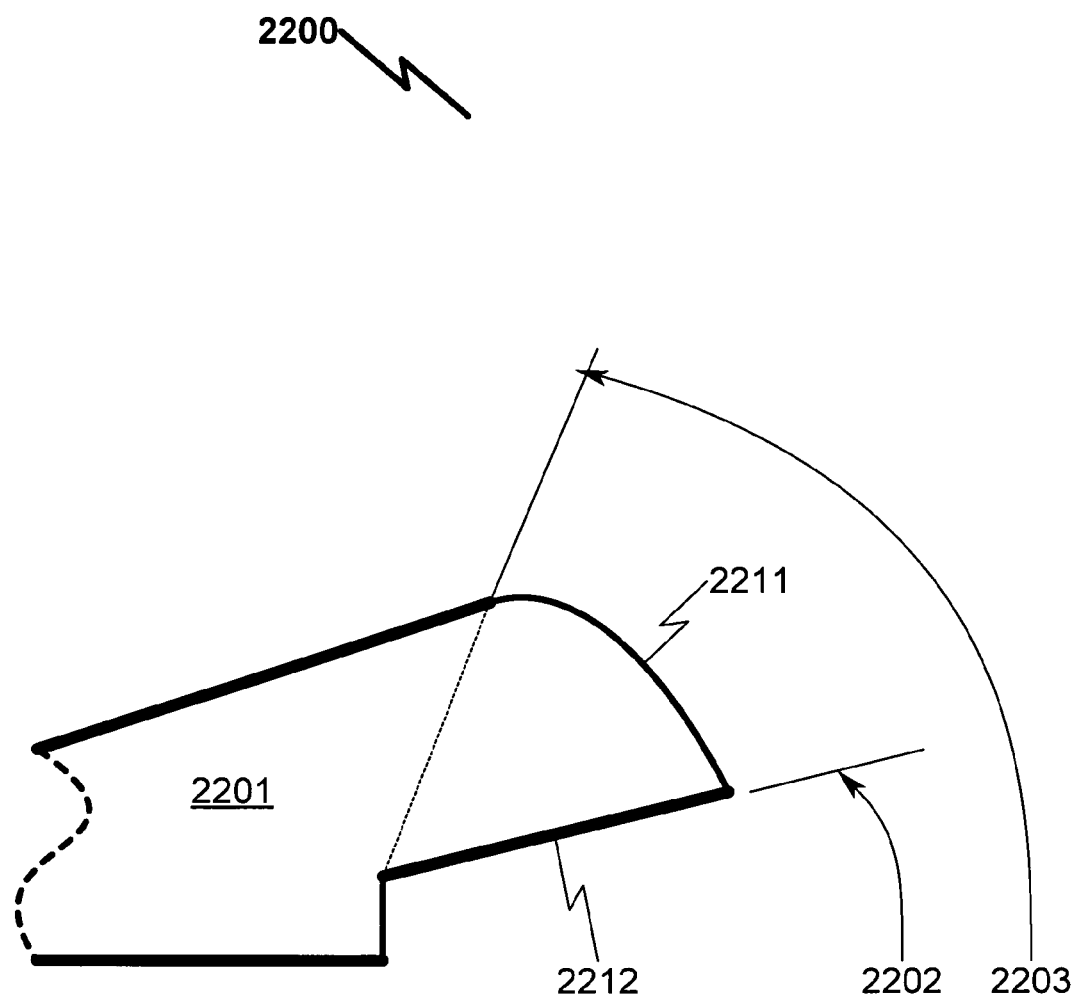
FIG. 22 illustrates a system view of a preferred exemplary embodiment of the present invention illustrating various construction angles associated with some preferred exemplary embodiments of the present invention.

As generally illustrated in FIG. 22 (2200), the present invention as embodied in individual solar/optical waveguides (2201) may incorporate several angles associated with the radiation injection port surface (2211). While a variety of curvatures are anticipated for this structure, many preferred embodiments utilize a circular curvature as generally illustrated in FIG. 22 (2200). This curvature intersects the bottom interface surface (2212) at an angle (2202) that is optimally 20 degrees, but may vary from this value in some embodiments. The upper portion of the injection port generally curves in optimal configurations to approximately 70 degrees as illustrated by the upper curvature point angle (2203). One skilled in the art will recognize that these lower (2202) curvature angle and upper (2203) curvature angles may be varied based on the latitude at which the solar/optical waveguide is to be implemented along with various environmental factors and physical placement factors. Thus, while the angles provided above may be optimal for some situations, they may need to be varied based on the environment in which the system is operated.

The present invention specifically anticipates that these angles may be modified in situations where the bottom face of the solar/optical waveguide is not parallel to the ground surface. In these situations (such as that which may be present if placed on an angled roof surface), the lower injection angle and upper injection port angle will be modified accordingly in an attempt to capture as much solar radiation as possible. One skilled in the art will recognize that in situations where the solar/optical waveguide is attached to the side of a building structure (or otherwise placed such that the bottom face of the solar/optical waveguide is substantially perpendicular to the ground surface) the lower injection port and upper injection port angle will be complementary to that illustrated in FIG. 22.

One skilled in the art will recognize from these teachings that the lower injection port and upper injection port angle may vary significantly based on the latitude at which the solar/optical waveguide is deployed.

Water Purification System and Method (2300)

The present invention specifically anticipates the use of MSCS embodiments configured for a variety of water treatment/purification applications. It is well known that microorganisms within impure water sources can be eradicated via the use of elevated ultraviolet radiation. The use of MSCS embodiments wherein the terminal radiation output of the vector/array is focused on a water source contained within some radiation-transparent container and/or pipeline permits this concentrated radiation source to be utilized as a passive water treatment system and method. All that is necessary for full treatment of the water source is a charcoal/felt and/or other sediment pre-filter for the water source.

Figure 23:
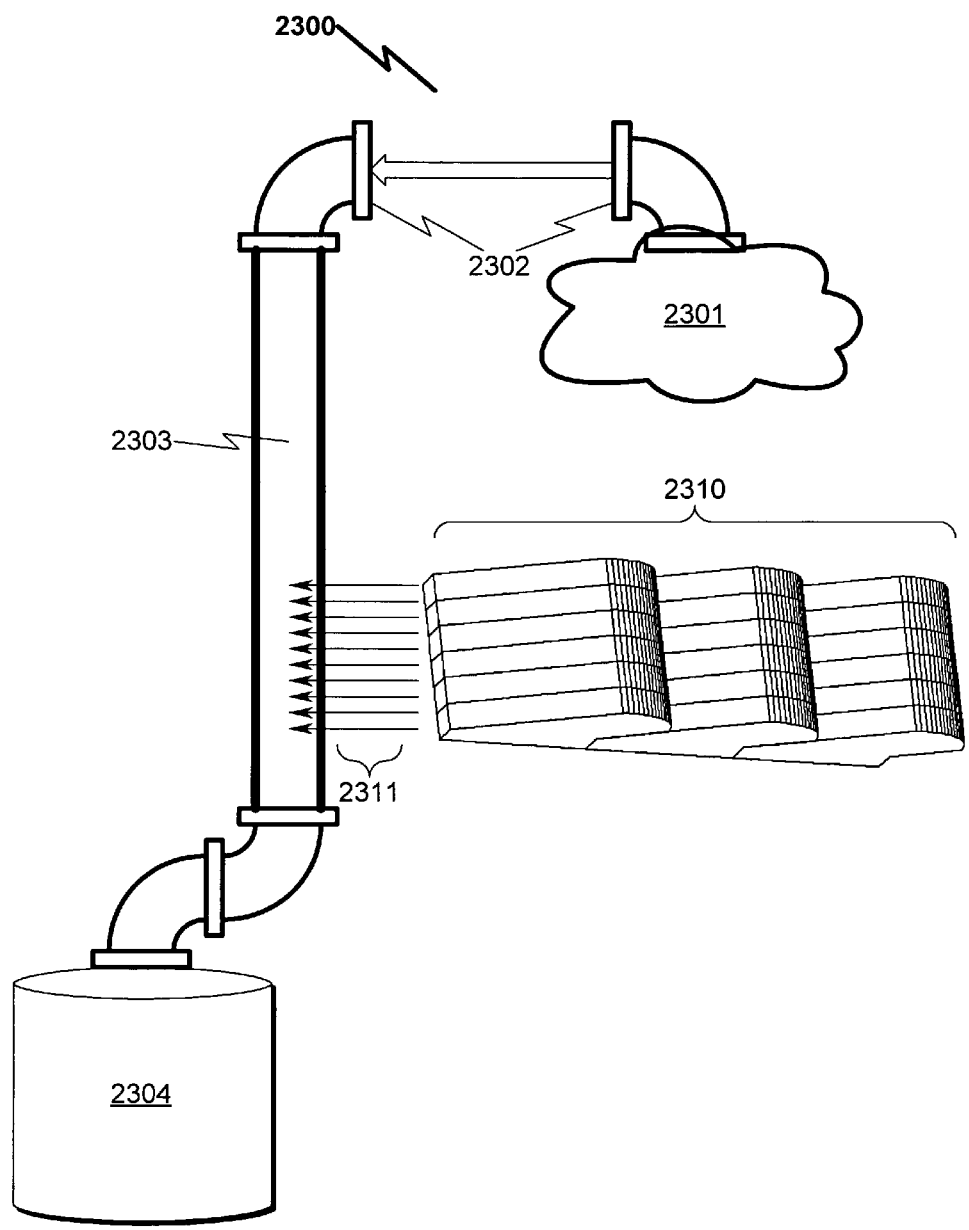
FIG. 23 illustrates a system view of a preferred exemplary embodiment of the present invention illustrating a solar water purification system.

As generally illustrated in FIG. 23 (2300), the present invention may incorporate a vector and/or array of solar/optical waveguide vectors (2310) that collect solar radiation and focus it for the purposes of providing water purification on a localized or commercial scale. The system generally permits a water source (2301) to be piped (2302) to a processing conduit (2303) that is transparent to impinging solar radiation (2311) collected from the solar/optical vectors and/or solar/optical array (2310). The impinging solar radiation purifies the water source (2301) which is then deposited in a holding tank (2304) for future use.

This system may be placed on the top or side of buildings or other structures such as water towers and provide extremely effective water purification without the need for chemicals or other water conditioners. Furthermore, this system can be utilized in local residences, businesses, or expanded to larger commercial configurations with little increase in cost.

Given the concern of many cities and municipalities regarding water borne diseases, the utilization of MSCS embodiments in this passive water treatment configuration will prove very effective in many situations where the water utility has available space/acreage to implement a passive solar radiation collection array using MSCS solar radiation waveguides. Since the system is totally passive, it may be implemented on the top of water towers, in surrounding grounds, or on municipal roads and/or highways.

Passive Lighting System and Method (2400)

The present invention anticipates the use of the solar/optical waveguide system and method in conjunction with vector and/or array configurations as detailed above to be the illumination source for a variety of passive structural lighting configurations. In particular, the present invention specifically anticipates the use of solar collection arrays that feed into "light pipes" that permit light to be injected into the pipe and then diffused in a gradual manner for interior building lighting purposes.

Figure 24:
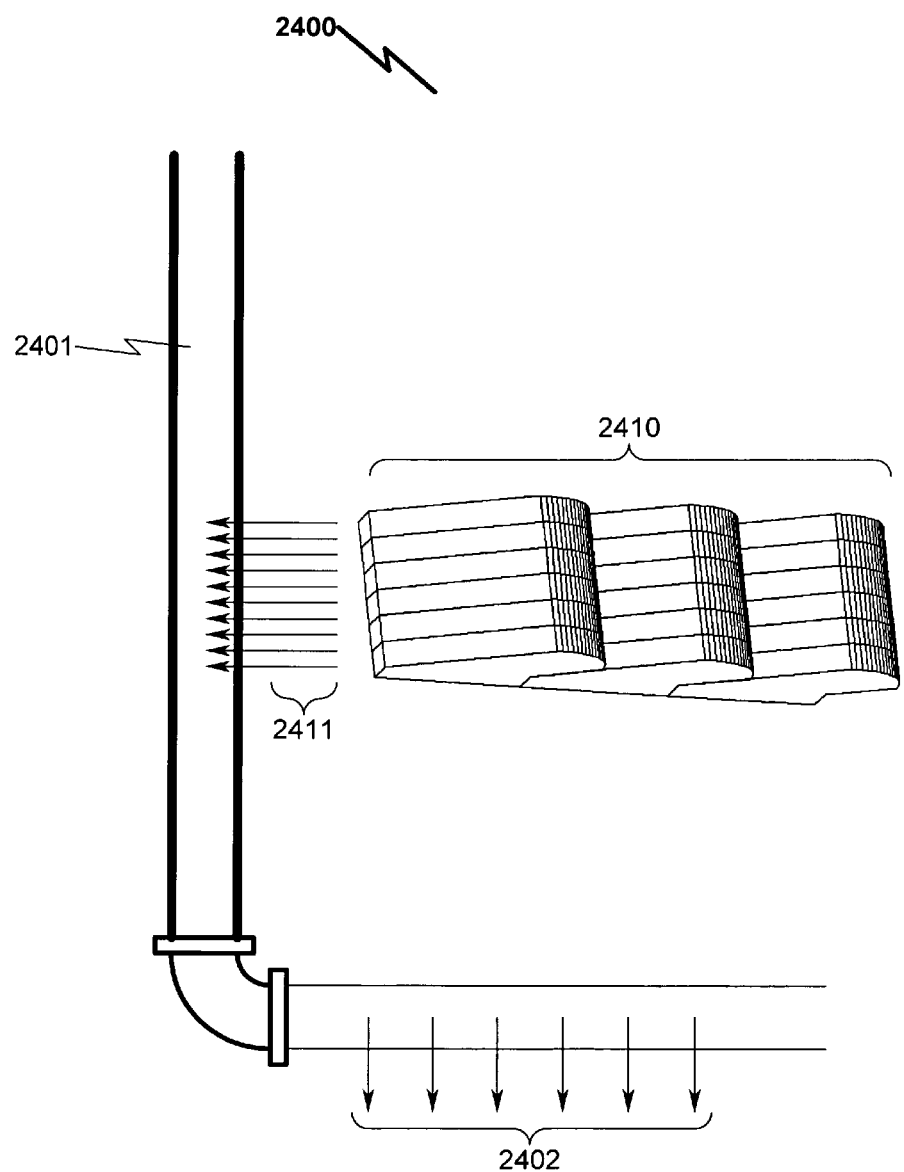
FIG. 24 illustrates a preferred exemplary embodiment of the present invention as applied to a passive lighting system.

As generally illustrated in FIG. 24 (2400), the system comprises a solar/optical waveguide vector and/or array (2410) that collects solar radiation and emits the collected result (2411) to a light collection tube (2401). This collection tube generally receives the transmitted solar radiation at an angle and "spirals" the radiation within the tube to transmit it within the tubing structure to a dispensing tube that has reflective and transparent properties to permit the light to be emitted (2402) in a controlled fashion.

Solar/Optical Waveguide Orientation (2500)

Figure 25:
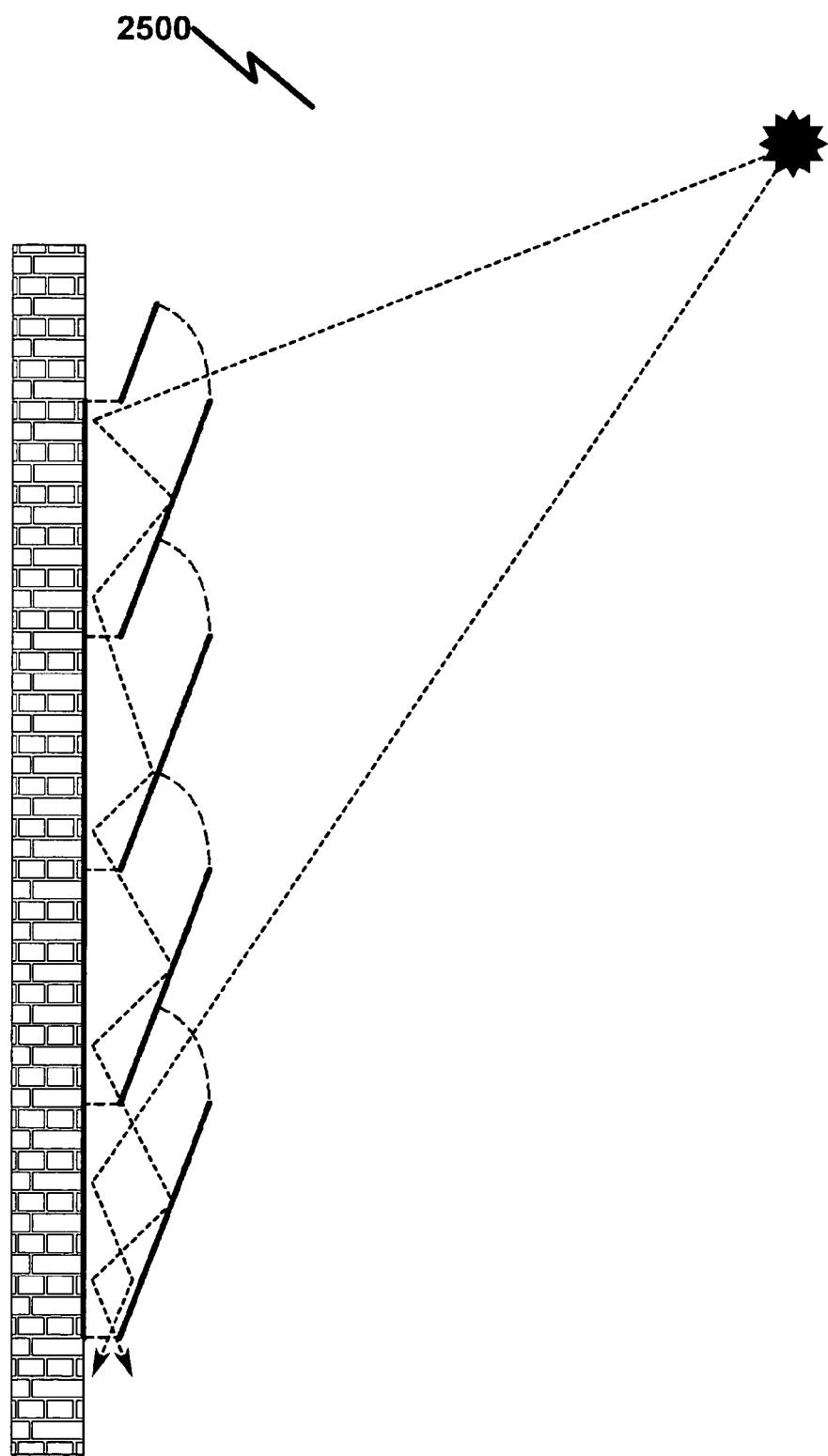
FIG. 25 illustrates side sectional and isometric views of preferred embodiments of the present invention detailing a vertical application of the present invention to solar collection on building structures.

As generally illustrated in FIG. 25 (2500), the solar/optical waveguide taught by the present invention may also be oriented in a vertical position to permit collection of solar radiation from the sides of buildings or other structures that are substantially vertical. This configuration also has application in situations where the walls and/or roofs of buildings are pitched at a significant angle to the plane of the surrounding ground.

Non-Horizontal Mounting Orientation Variant (2600)

Figure 26:
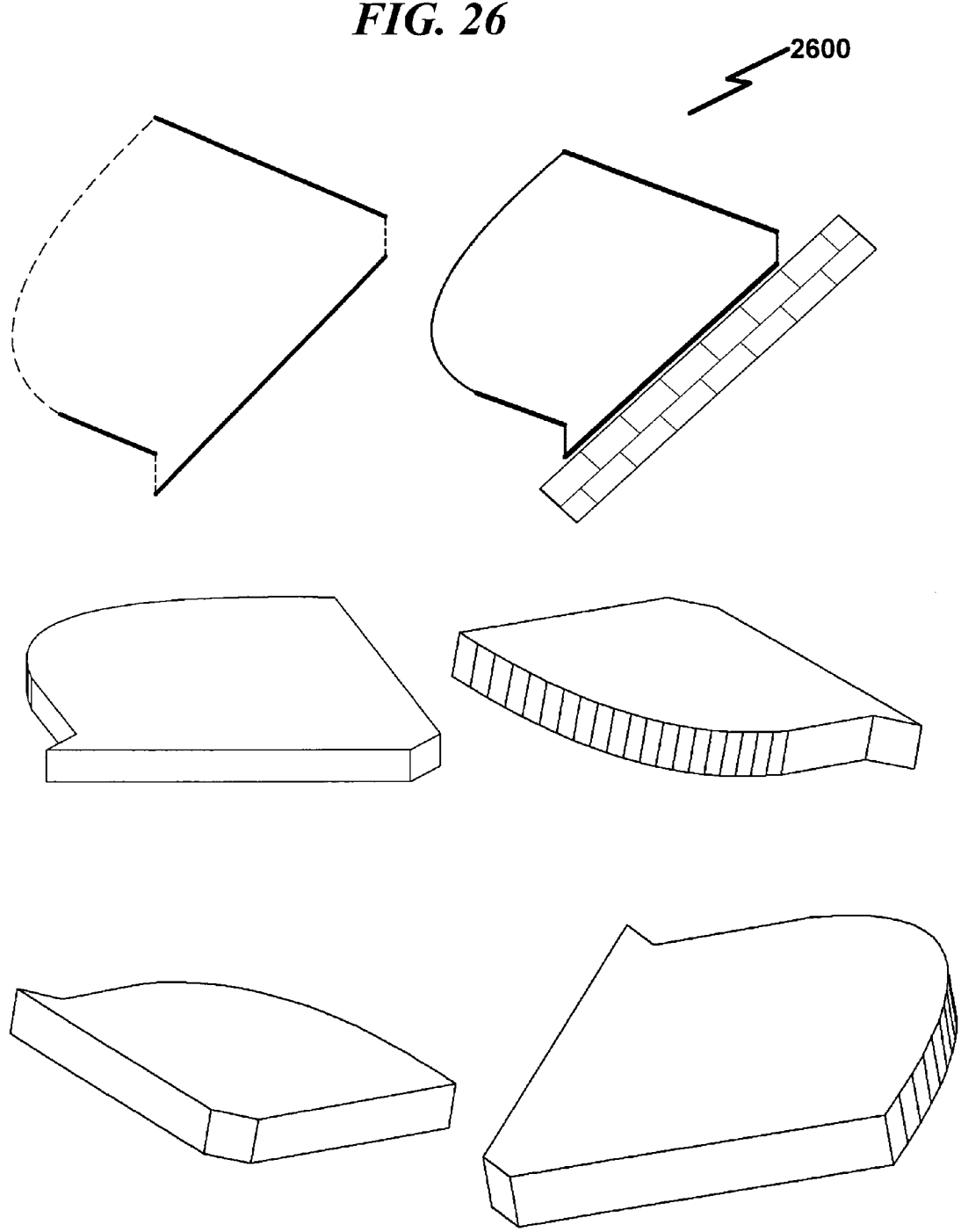
FIG. 26 illustrates side sectional and isometric views of preferred embodiments of the present invention detailing a non-horizontal application of the present invention to solar collection on roofing structures.

The solar/optical radiation waveguide (SOW) concept described above may be applied in a wide variety of mounting orientations, many of which are non-horizontal (non-parallel to the ground surface). The present invention anticipates that minor modifications to the overall SOW body can be implemented to accommodate these situations without departing from the spirit of the invention. One such application for non-horizontal mounting is in the coverage of roofing structures to support collection of solar energy. As an example of the invention applied to this situation, the side profile and isometric views of FIG. 26 (2600) permits solar energy to be collected on an inclined roofing surface (here depicted using an exemplary 45-degree pitch).

Solar/Optical Waveguide Internal Reflectors (2700)

The solar/optical radiation waveguide (SOW) concept described above may incorporate a wide variety of methodologies to affect internal reflection and "gathering" of injected and pass-thru solar radiation for presentation to the output radiation port. As generally illustrated in FIG. 27 (2700), some preferred exemplary embodiments may utilize "curved" internal reflective surfaces that are manufactured internal to the SOW but are not necessarily part of the outer structural surface of the SOW.

Figure 27:
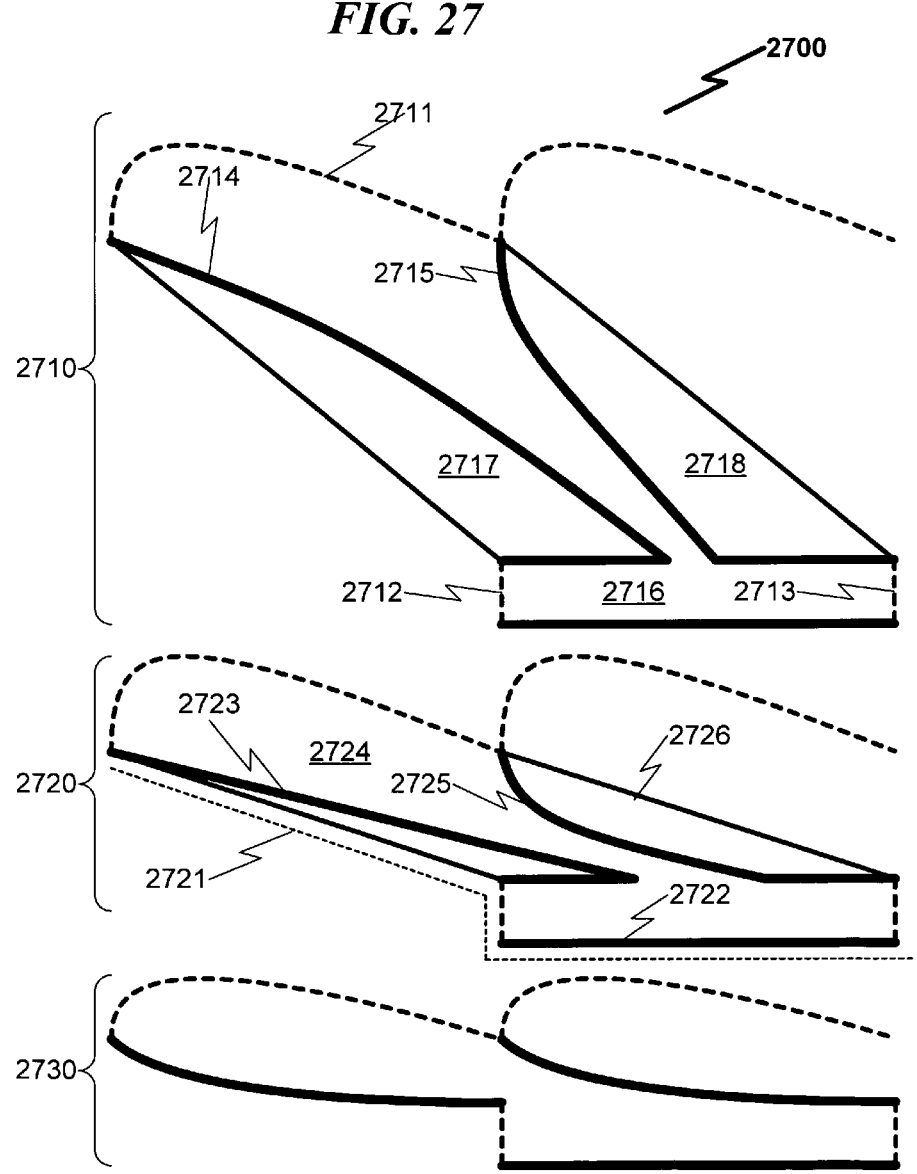
FIG. 27 illustrates a side sectional view of preferred embodiments of the present invention incorporating internal UV/optically reflective surfaces and illustrates a generalized manufacturing theme for the construction of these invention variants.

In FIG. 27 (2700), several different SOW profiles (2710, 2720, 2730) are presented, with optically transmissive interfaces indicated with dashed lines as in other examples. Here we see that the front top injection port (2711), front radiation input port (2712), and rear radiation output port (2713) operate as previously discussed. However, internal reflective surfaces (2714, 2715) present within the SOW body act to reflect the injected solar radiation to the bottom radiation pipeline (2716) while the volumetric areas of the SOW normally transmissive to solar radiation (2717, 2718) are blocked by the internal reflective surfaces (2714, 2715).

Note that reflective surfaces (2714, 2715) within the body of the SOW may be curved using a wide variety of methodologies. This could include a parabolic internal reflection surface to focus the solar energy within the injection port transmission tube (2716) at the bottom of the structure.

This SOW construction approach minimizes losses within the SOW body and provides a methodology to optimally "guide" the solar radiation from the top front injection port (2711) to the final rear output radiation port (2713). Additionally, by placing the reflective surfaces (2714, 2715) within the body of the SOW, they are protected from the elements and other potential sources of physical damage. Finally, incorporating of the reflective surfaces (2714, 2715) within the body of the SOW may permit optimization of the MSCS SOW manufacturing process as detailed in the manufacturing method of FIG. 31 (3100).

Generally speaking, an optimal formation of this preferred SOW embodiment may incorporate the following manufacturing steps:

(1) Fabricate first collector element using backstop for left reflector element (2721);
(2) Inject/cool bottom reflector element with UV reflector (2722);
(3) Inject UV left reflector (2723);
(4) Position main body injection mold with curved upper surface contacting left reflector and inject main collector body element with UV transparent material (2724);
(5) Lift main body injection mold and inject/cool right reflector element with UV reflector material (2725); and
(6) Shift completed SOW collector element to the left and prepare for fabrication of next collector element by injecting filler material to the right of the right reflector element (2726).

One skilled in the art will recognize that many other variations of this basic manufacturing theme are possible without departing from the spirit of the invention. While the above manufacturing theme utilizes ultraviolet (UV) reflective/transmissive materials, one skilled in the art will recognize that in this context "UV" and "optically" are interchangeable terms depending on the particular MSCS application.

Passive Photovoltaic/Seebeck System and Method

The present invention anticipates the use of the solar/optical waveguide system and method in conjunction with vector and/or array configurations as detailed above to be the illumination source for a variety of passive photovoltaic/Seebeck electrical energy generation configurations. In particular, the present invention specifically anticipates the use of solar collection arrays that feed into fixed photovoltaic/Seebeck arrays to produce electrical power. The advantage of using the present invention over that of the prior art is that no mechanical orientation system is necessary to permit the photovoltaic/Seebeck array to operate in an optimal radiation gathering pattern. This greatly simplifies the installation and operation of photovoltaic/Seebeck arrays and increases the efficiency of existing arrays by improving their overall radiation capture profile.

Of particular import in this application are situations where the placement of photovoltaic/Seebeck cells is impractical due to space constraints. In these situations, the MSCS SOW modules may be arrayed in vectors/planes to "route" the solar energy to the area in which the photovoltaic/Seebeck cells are mounted. For example, situations in which the placement of the photovoltaic cells would be aesthetically unpleasing may be addressed by collecting solar energy using the MSCS SOWs and routing the solar energy to a "hidden" portion of the building structure that supports the photovoltaic cells. This approach can be taken in the production of electricity from photovoltaic cells and Seebeck heat junction electricity generators, and can be implemented on building structure walls (FIG. 25 (2500)) and roofing structures (FIG. 26 (2600)).

Passive Roadway and Building Collection System (2800)

The present invention anticipates the use of the solar/optical waveguide system and method in conjunction with vector and/or array configurations as detailed above to permit implementation of solar collection arrays on road surfaces, pedestrian pathways, the exterior faces and tops of building structures, and ground spaces surrounding building structures and the like. The passive nature of the present invention combined with its modular approach to solar radiation collection and inexpensive individual waveguide cost profile promotes the use of collection vectors and/or arrays in arenas previously cost prohibitive to passive solar radiation systems.

Figure 28:
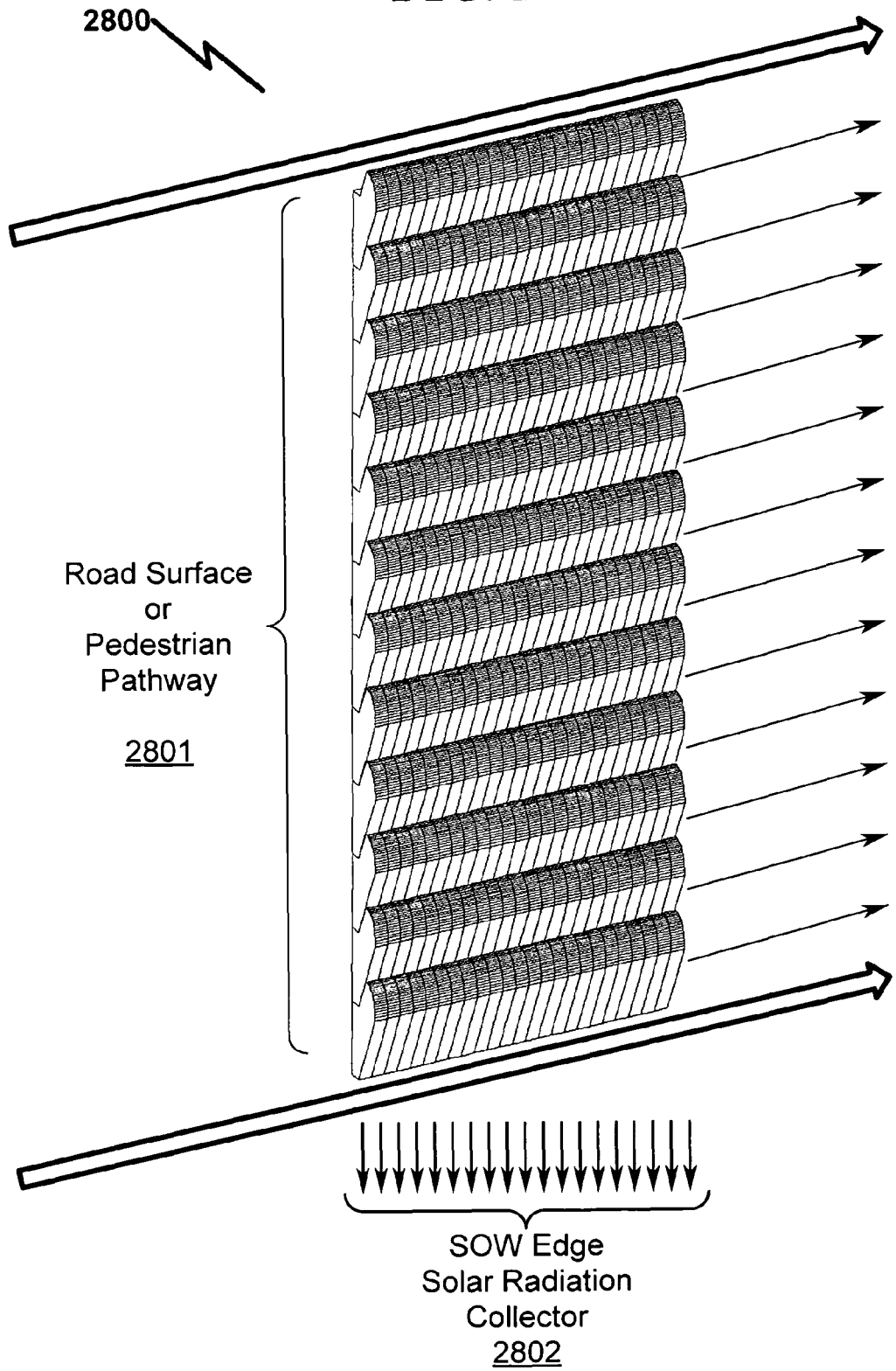
FIG. 28 illustrates a perspective view of a preferred exemplary application context of the present invention wherein MSCS SOW collectors are arrayed to collect solar radiation on a vehicle roadway or pedestrian pathway.

Specifically, the present invention anticipates the use of solar/optical waveguide vectors and/or arrays (properly oriented to the direction of the sun) as generally illustrated in FIG. 28 (2800) to be used on road surfaces and pedestrian pathways (2801) with the resulting piped solar radiation to be collected at the side of the road/pathway (2802) for the purpose of generating electrical power and/or use within heat pump systems for water heating, etc.

Furthermore, the present invention specifically anticipates the use of solar/optical waveguide vectors and/or arrays to be used for the purposes of providing electricity necessary for electrolysis-based hydrogen way-stations to provide hydrogen in remote areas for the purposes of providing fuel for hydrogen powered trucks and/or automobiles. Excess heat associated with these collection techniques can be utilized in Sterling-style steam engines for the purposes of providing electricity for charging battery powered trucks and/or automobiles.

Additionally, the present invention is well suited for use in providing auxiliary heating for water heating and/or building heating applications wherein the solar collection vectors/arrays are integrated into the exterior structure of the building and/or building grounds.

Water Heating/Electricity Generation System and Method (2900)

The present invention anticipates the use of the solar/optical waveguide system and method in conjunction with vector and/or array configurations as detailed above to permit implementation of solar water heaters that passively heat water as well as generate electricity via the use of the waste heat and using the remaining optical radiation to power solar panels for electricity generation. This system and method anticipate modular water heating and purification systems that are local to a given building or structure and that permit the structure to operate semi-independently from the electrical grid. Given that water heating is generally the most energy consumptive element of a home, the present invention can be advantageously used to significantly reduce or eliminate the need for electricity from the local electrical grid.

As mentioned previously, the solar/optical waveguides may be cascaded in vectors and/or arrays in configurations that are both parallel to and at an angle with the ground surface. This flexibility makes these vectors/arrays well suited for installation on both the roof and exterior walls of a building structure. When properly integrated, the present invention anticipates and can provide passive interior lighting, water heating, water purification, water recycling, electricity generation, and insulation for a building structure. These configurations are especially advantageous in undeveloped countries with weak and/or non-existent utility infrastructures.

Figure 29:
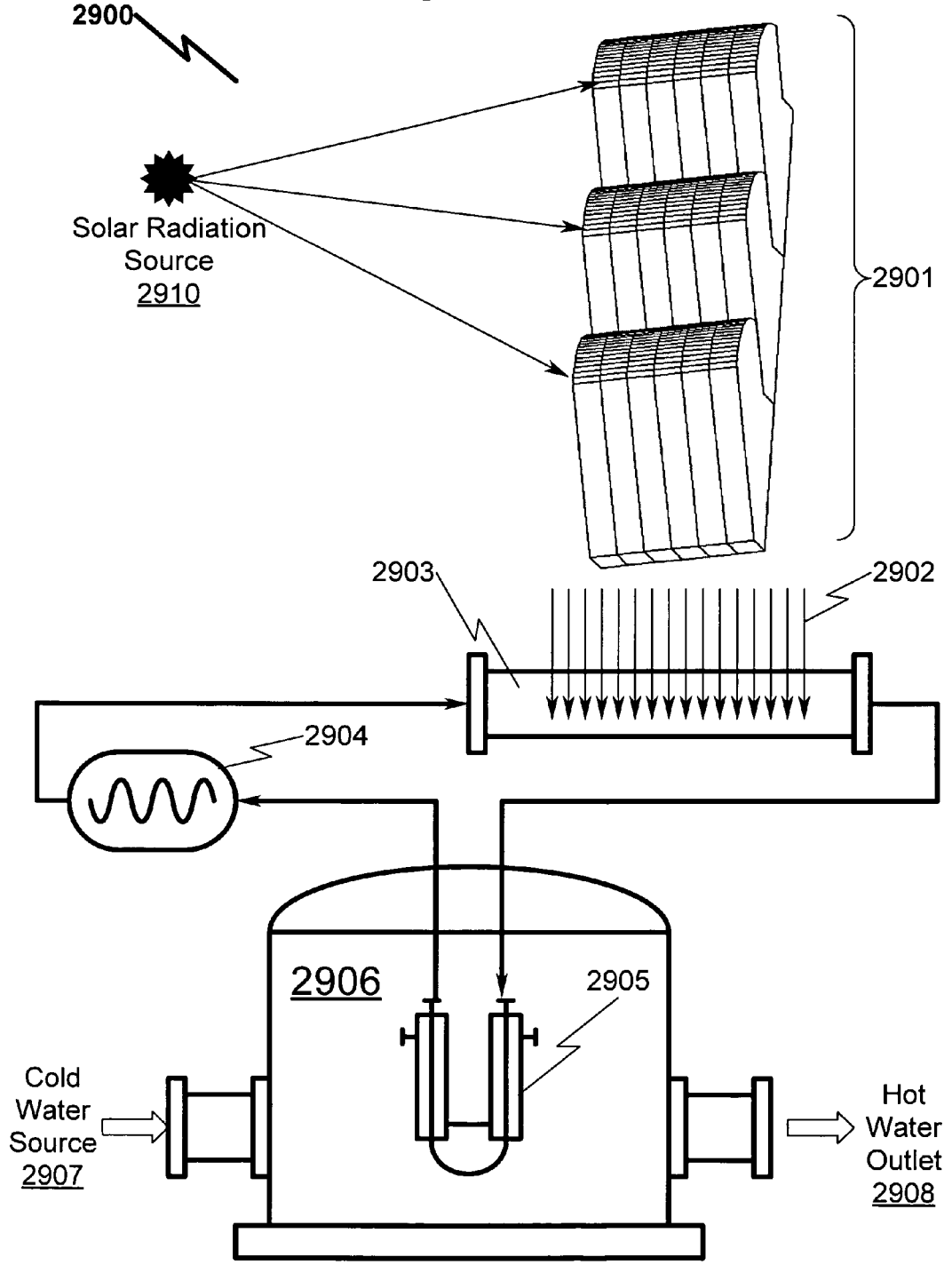
FIG. 29 illustrates an exemplary schematic of a typical implementation of the present invention as applied to a solar powered hot water generation system.

Referencing FIG. 29 (2900), a typical solar water heating system utilizing a vector and/or array (2901) of the MSCS SOW devices is depicted. Here the solar radiation (2910) injects solar energy into the MSCS array (2901) which then emits this combined and concentrated solar radiation (2902) into a heat transfer means (2903) (typically a piping mechanism or heat exchanger to transfer heat to water or a non-freezing liquid contained therein). This heat transfer means (2903) is fed with a pump (2904) that services a heat exchanger (2905) within a water reservoir (2906) that retrieves water from a cold water source (2907) and converts it to a hot water output (2908). The heat transfer means (2903) may take a wide variety of forms well known in the art and may include such elements as plate-and-frame heat exchangers and the like.

As can be surmised from this diagram, the advantages of the MSCS SOW architecture in this application are significant. Placement of MSCS SOW arrays on building roofs and/or exterior walls permits solar energy to be "piped" away from the surface of the building and concentrated in the heat transfer means (2903) for use in hot water generation. This saves significant energy in building operations given that hot water generation is a majority of energy consumption in many housing structures. Additionally, by removing incident solar radiation from the building rooftop/exterior, the present invention naturally cools the building at times of the day in which air conditioning would normally be required. In winter, hot water generated by the system can be utilized to heat the interior of the building using conventional forced water radiant heat technologies.

Integrated Energy Harvesting System and Method (3000)

Figure 30:
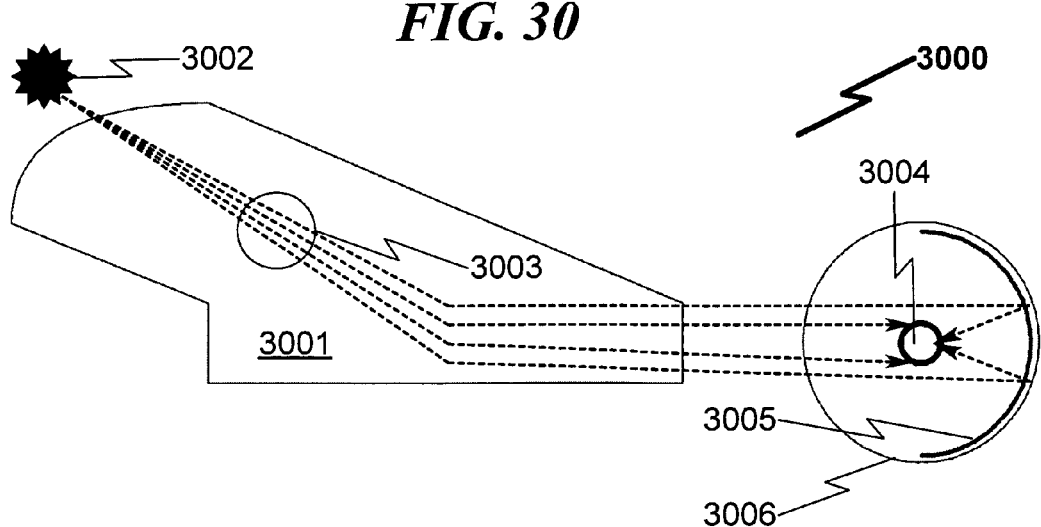
FIG. 30 illustrates side sectional and isometric views of an exemplary implementation of the present invention as applied to integrated solar energy harvesting system and method.
Figure 30:
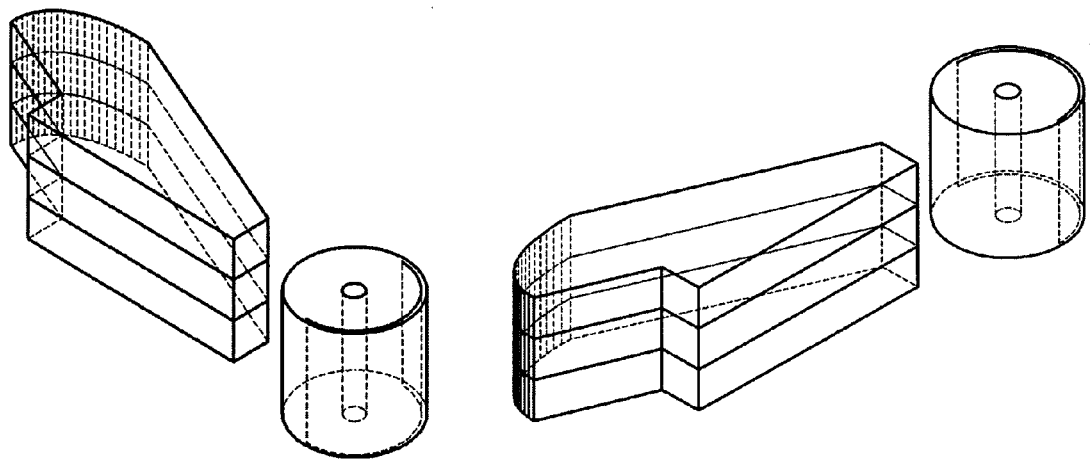
Figure 30:
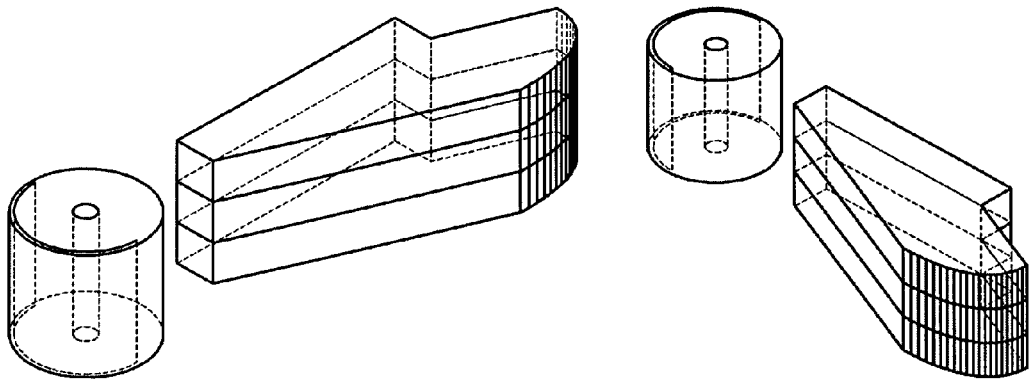

The present invention anticipates the use of the solar/optical waveguide system and method in conjunction with vector and/or array configurations as detailed above to permit implementation an integrated solar energy harvesting system and method as generally illustrated in FIG. 30 (3000). In these configurations, solar/optical waveguides (3001) are configured in vector and/or arrays to accept solar radiation (3002) and collect (3003) it for presentation to irradiate heat exchanger tubes (3004) containing water and/or oil used in a heat pump configuration. These heat exchanger tubes (3004) are optimally augmented with reflective surfaces (3005) within the heat exchanger containment structure (3006) to focus and inject the MSCS SOW output (3003) onto the heat exchanger tubes (3004). The heated water/oil from the heat exchanger tubes (3004) is then used to locally provide hot water via a heat exchanger within a containment vessel as generally illustrated in FIG. 29 (2900). Excess heat is then used to operate a Sterling engine to make electricity. Water used in this system has been irradiated and may be utilized as potable water for toilet flushing, bathing, or other uses.

The heat collector (3004) in this configuration may utilize reflective tubes (3005) containing copper heat pipes coated with black titanium oxide in some configurations. In other configurations a transparent water transport mechanism may be utilized to provide for water purification in conjunction with electricity generation utilizing photovoltaic cells.

Water Recycling System and Method

The present invention anticipates the use of the solar/optical waveguide system and method in conjunction with vector and/or array configurations as detailed above to permit implementation of water recycling local to a given building structure. In these configurations, the solar/optical waveguides are configured in an inclined array fashion. Dirty water is deposited at the top of the array and permitted to be irradiated as it flows down the incline. Mechanical filters remove remaining particulate matter and the bottom of the array serves to further irradiate the water to kill bacterial contamination. The heat collected by the array is utilized to distill the remaining water to make it potable. Mechanical scrubbing of the solar/optical array surface at regular intervals may be utilized to collect the solid waste for appropriate disposal.

This configuration permits much of the "gray water" emitted by a given structure or habitation to be recycled locally for the purposes of providing potable water for drinking and bathing, thus conserving a scarce natural resource. This technique may also be implemented in areas having access to seawater in substitution of reverse osmosis filtration systems. As such, this technique can be implemented very inexpensively and on a variety of scales to promote the use of potable water in many remote areas of the world.

Generalized Solar Collector Manufacturing Method (3100)

Figure 31:
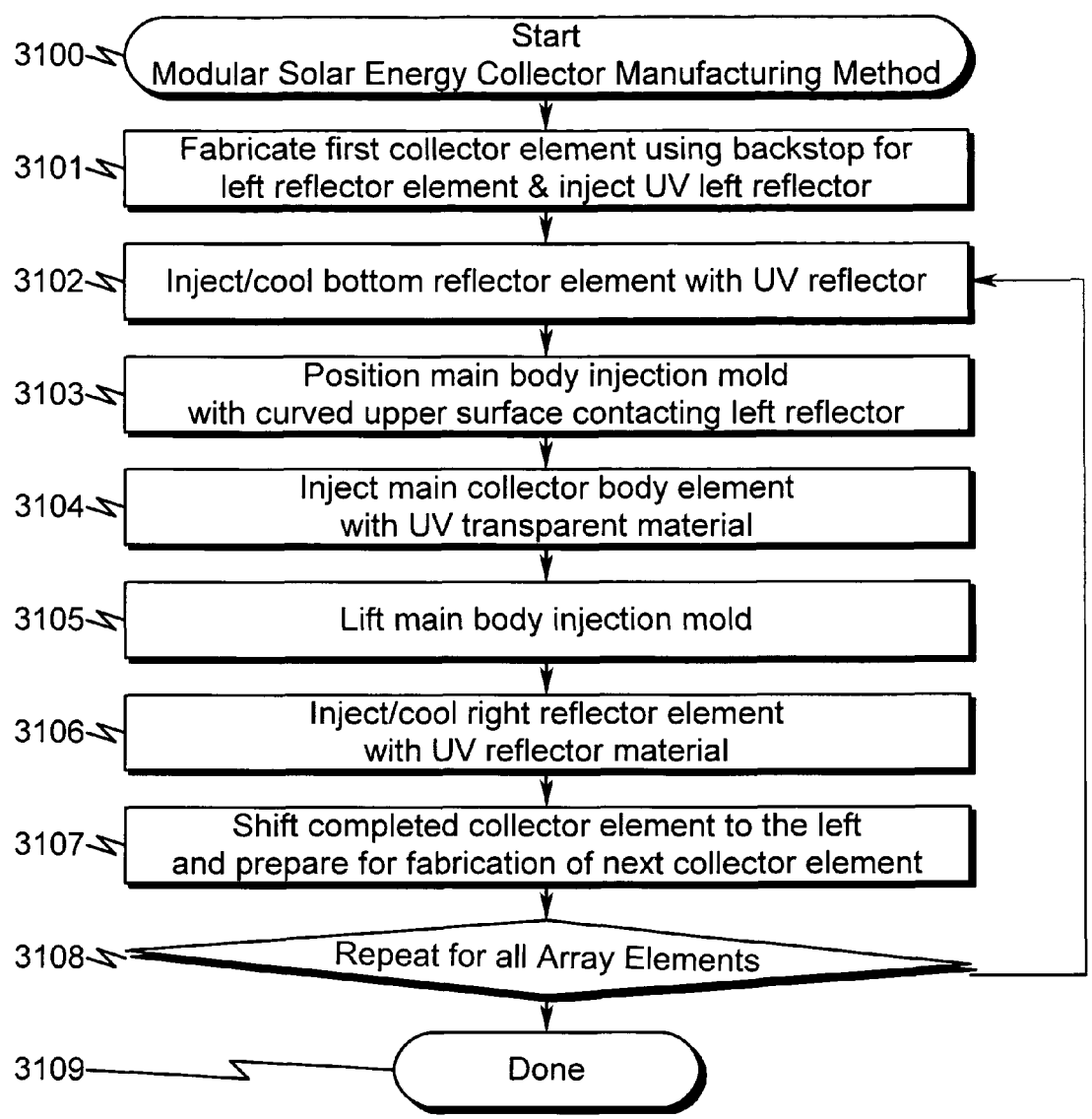
FIG. 31 illustrates a generalized function flowchart diagram describing an exemplar present invention manufacturing method.

While many methods may be utilized to manufacture the solar/optical radiation waveguide (SOW) structures taught by the present invention, one methodology is preferred as it permits automated production of the SOW structures in planar arrays, tiles, interlocking plates, linear vectors, and the like. As generally illustrated in FIG. 31 (3100), the present invention teaches this solar energy collector manufacturing method as having the following steps:
(1) Fabricate first collector element using backstop for left reflector element & inject UV left reflector (3101);
(2) Inject/cool bottom reflector element with UV reflector (3102);
(3) Position main body injection mold with curved upper surface contacting left reflector (3103);
(4) Inject main collector body element with UV transparent material (3104);
(5) Lift main body injection mold (3105);
(6) Inject/cool right reflector element with UV reflector material (3106);
(7) Shift completed collector element to the left and prepare for fabrication of next collector element (3107);
(8) Repeat for all Array Elements by proceeding to step (2) as necessary (3108);
(9) Terminate solar energy collector manufacturing method (3109).

One skilled in the art will recognize that these steps may be rearranged without detracting from the teachings of the present invention, and may be augmented with the previously disclosed system embodiments with no loss of generality in the teachings of the invention.

The key to this manufacturing process is to step the fabrication of each SOW collector element so that the SOW collectors can be produced in "sheets" rather than individual SOW elements. By stepping the manufacturing process and making each SOW collector element symmetric, the process can be automated to produce SOW collector panels of arbitrary width/length. Note that the same manufacturing concept can be applied to situations where glass is used in conjunction with metalized reflective coatings, or alternatively use glass of different refractive index (or doping) to achieve the desired internal reflective property.

Generalized Solar Collection Method (3200)

Figure 32:
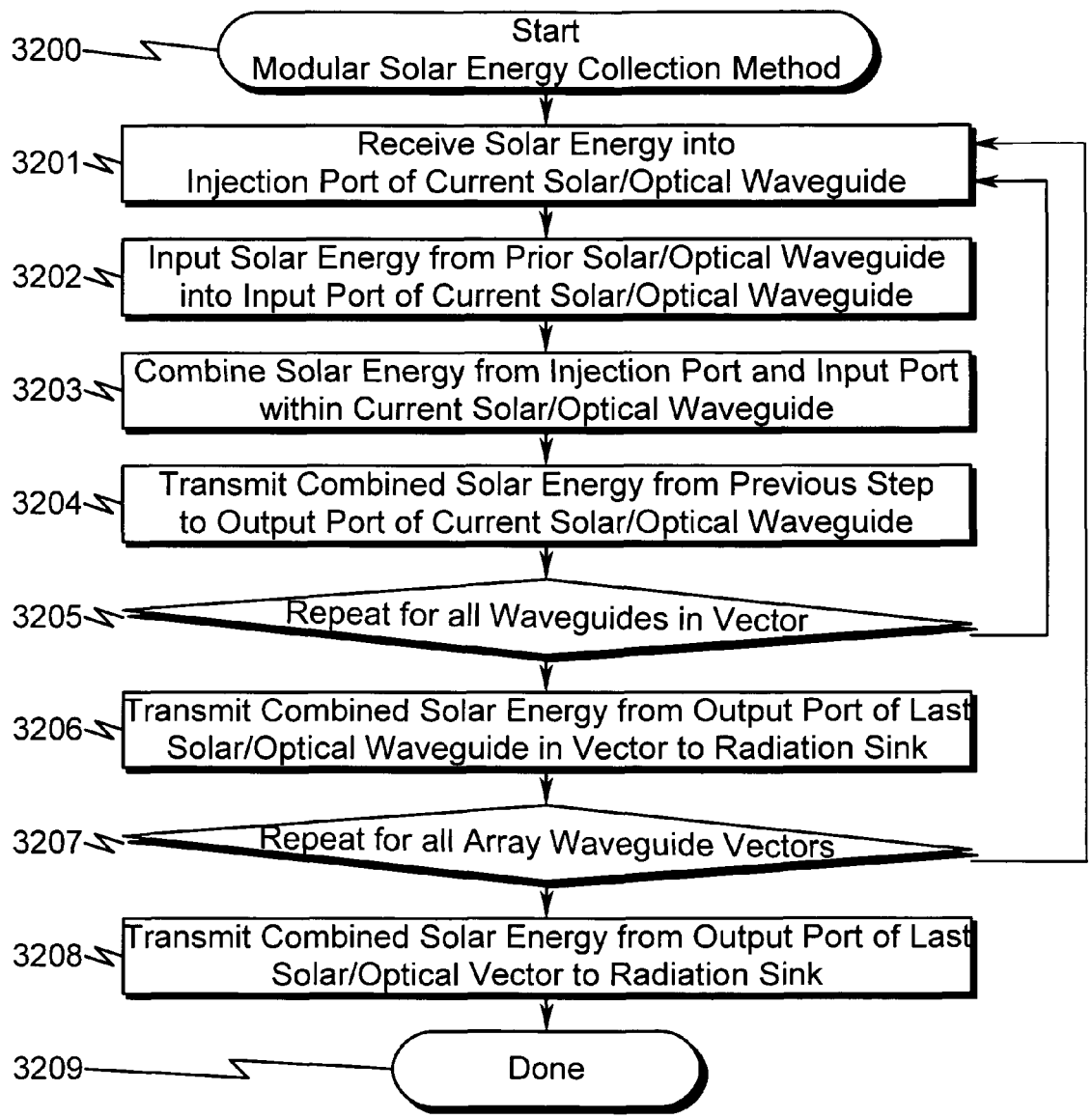
FIG. 32 illustrates a generalized function flowchart diagram describing the present invention method.

As generally illustrated in FIG. 32 (3200), the present invention teaches a solar energy collection method having the following steps:
(1) Receive Solar Energy into Injection Port of Current Solar/Optical Waveguide (3201);
(2) Input Solar Energy from Prior Solar/Optical Waveguide into Input Port of Current Solar/Optical Waveguide (3202);
(3) Combine Solar Energy from Injection Port and Input Port within Current Solar/Optical Waveguide (3203);
(4) Transmit Combined Solar Energy from Previous Step to Output Port of Current Solar/Optical Waveguide (3204);
(5) Repeat for all Waveguides in Vector (3205) by looping to step (1) as necessary;
(6) Transmit Combined Solar Energy from Output Port of Last Solar/Optical Waveguide in Vector to Radiation Sink (3206);
(7) Repeat for all Array Waveguide Vectors (3207) by looping to step (1) as necessary;
(8) Transmit Combined Solar Energy from Output Port of Last Solar/Optical Vector to Radiation Sink (3208).

One skilled in the art will recognize that these steps may be rearranged without detracting from the teachings of the present invention, and may be augmented with the previously disclosed system embodiments with no loss of generality in the teachings of the invention.

System Summary

The present invention system anticipates a wide variety of variations in the basic theme of construction, but can be generalized as a Modular Solar Collector System (MSCS) comprising a solar/optical waveguide (SOW) having a waveguide body comprising:
(a) front top radiation injection port;
(b) front face radiation input port; and
(c) rear face radiation output port;
wherein
the front top radiation injection port collects incident radiant solar energy from a solar radiation source at a variety of incident angles on the top surface of the waveguide body;
the incident radiant solar energy is summed within the waveguide body with that of a pass-thru radiation source input into the front face radiation input port to produce a summed radiation result;
the summed radiation result is emitted at the rear face radiation output port to a solar radiation sink;
the waveguide body further comprises optically reflective surfaces exclusive of the front top radiation injection port, the front face radiation input port, and the rear face radiation output port; and
the optically reflective surfaces direct solar energy from the front top radiation injection port and the front face radiation input port to the rear face radiation output port.

This general system summary may be augmented by the various elements described herein to produce a wide variety of invention embodiments consistent with this overall design description.

Method Summary

The present invention method anticipates a wide variety of variations in the basic theme of implementation, but can be generalized as a Modular Solar Collector Method (MSCM) wherein the method operates within the context of a Modular Solar Collector System (MSCS) comprising a solar/optical waveguide (SOW) having a waveguide body comprising:
(a) front top radiation injection port;
(b) front face radiation input port; and
(c) rear face radiation output port;
wherein
the front top radiation injection port collects incident radiant solar energy from a solar radiation source at a variety of incident angles on the top surface of the waveguide body;
the incident radiant solar energy is summed within the waveguide body with that of a pass-thru radiation source input into the front face radiation input port to produce a summed radiation result;
the summed radiation result is emitted at the rear face radiation output port to a solar radiation sink;
the waveguide body further comprises optically reflective surfaces exclusive of the front top radiation injection port, the front face radiation input port, and the rear face radiation output port; and
the optically reflective surfaces direct solar energy from the front top radiation injection port and the front face radiation input port to the rear face radiation output port;
the method comprising:
(1) Injecting radiant solar energy into the front top radiation injection port of a modular solar collector system (MSCS);
(2) Inputting pass-thru solar energy into the front face radiation input port of the modular solar collector system (MSCS);
(3) Combining the radiant solar energy and the pass-thru solar energy to produce a summed solar energy result;
(4) Transmitting the summed solar energy result to the rear face radiation output port of the modular solar collector system (MSCS); and
(5) Processing the solar energy output from the rear face radiation output port of the modular solar collector system (MSCS) in an attached modular solar collector system (MSCS) or in a terminal solar application.

This general method summary may be augmented by the various elements described herein to produce a wide variety of invention embodiments consistent with this overall design description.

System/Method Variations

The present invention anticipates a wide variety of variations in the basic theme of construction. The examples presented previously do not represent the entire scope of possible usages. They are meant to cite a few of the almost limitless possibilities.

The present invention has a number of anticipated embodiments, many of which are preferred. Features included in some of these preferred system/method embodiments may include but are not limited to the following:

An embodiment wherein a plethora of the solar/optical waveguides are arranged in a linear vector configuration wherein the front radiation input port of one solar/optical waveguide is coincident with the rear output port of an adjacent solar/optical waveguide; and solar radiation injected into each of the solar/optical waveguides is collected and transmitted to the rear face output port surface at one end of the linear vector.

An embodiment wherein a plethora of the solar/optical waveguides are arranged in an array or planar array configuration wherein the front radiation input port of one solar/optical waveguide is coincident with the rear output port of an adjacent solar/optical waveguide; and solar radiation injected into each of the solar/optical waveguides is collected and transmitted to the rear face output port surface at one edge of the array/planar array.

An embodiment wherein the array/planar array is integrated into a solar energy collection system attached to a roofing structure.

An embodiment wherein the array/planar array is integrated into a ground-based solar energy collection system supporting pedestrian traffic.

An embodiment wherein the array/planar array is integrated into a ground-based solar energy collection system supporting vehicle traffic.

An embodiment wherein the rear face output port surface at one edge of the array/planar array supplies solar energy to a solar water purification system.

An embodiment wherein the rear face output port surface at one edge of the array/planar array supplies solar energy to a solar water heating system.

An embodiment wherein the rear face output port surface at one edge of the array/planar array supplies solar energy to a passive building lighting system.

An embodiment wherein the waveguide body comprises glass.

An embodiment wherein the waveguide body comprises low lead glass.

An embodiment wherein the waveguide body comprises borosilicate glass.

An embodiment wherein the waveguide body comprises Crown glass.

An embodiment wherein the waveguide body comprises quartz glass.

An embodiment wherein the waveguide body comprises clear plastic.

An embodiment wherein the waveguide body comprises acrylic plastic.

An embodiment wherein the waveguide body comprises polycarbonate plastic.

An embodiment wherein the waveguide body comprises polymethyl methacrylate plastic.

An embodiment wherein the waveguide body comprises allyl diglycol carbonate (ADC) plastic.

An embodiment wherein the front face input port surface is concave.

An embodiment wherein the front face input port surface is substantially circular.

An embodiment wherein the rear face output port surface is convex.

An embodiment wherein the rear face output port surface is substantially circular.

An embodiment wherein the front face input port surface has an area that is substantially identical to the area of the rear face output port surface.

An embodiment wherein the top surface is convex curved from the right side surface to the left side surface.

An embodiment wherein the front top injection port surface is convex curved from the right side surface to the left side surface.

An embodiment wherein the top surface and the bottom injection/input interface surface are substantially parallel.

An embodiment wherein the top surface, the bottom surface, the right side surface, the left side surface, and the bottom injection/input interface surface further comprise an aluminum coating.

An embodiment wherein the top surface, the bottom surface, the right side surface, the left side surface, and the bottom injection/input interface surface further comprise a silver coating attached by vapor deposition.

An embodiment wherein the top surface, the bottom surface, the right side surface, the left side surface, and the bottom injection/input interface surface further comprise a silver nitrate coating.

An embodiment wherein the top surface, the bottom surface, the right side surface, the left side surface, and the bottom injection/input interface surface further comprise an oxide of silver coating.

An embodiment wherein the top surface, the bottom surface, the right side surface, the left side surface, and the bottom injection/input interface surface further comprise a surface treatment to alter the index of refraction of the surfaces of the waveguide body.

An embodiment wherein the top surface, the bottom surface, the right side surface, the left side surface, and the bottom injection/input interface surface further comprise pure fused silica.

An embodiment wherein the top surface, the bottom surface, the right side surface, the left side surface, and the bottom injection/input interface surface further comprise pure fused silica comprising a negative dopant.

An embodiment wherein the top surface, the bottom surface, the right side surface, the left side surface, and the bottom injection/input interface surface further comprise pure fused silica and the remaining portions of the waveguide body comprising fused silica comprising a positive dopant.

An embodiment wherein the right side surface is substantially flat.

An embodiment wherein the left side surface is substantially flat.

An embodiment wherein the right side surface is substantially parallel to the left side surface.

An embodiment wherein the plane of the bottom injection/input interface surface forms an angle of approximately 20 degrees with respect to the plane of the bottom surface.

An embodiment wherein a plane extending from the intersection of the bottom injection/input interface surface and the front face input port surface to the intersection of the top surface and the front top injection port surface forms an angle of approximately degrees with respect to the plane of the bottom surface.

One skilled in the art will recognize these variants may be combined in some preferred embodiments to achieve desirable characteristics consistent with the overall teaching of the invention, and that other embodiments are possible based on combinations of elements taught within the above description.

CONCLUSION

A modular solar collector system (MSCS) and modular solar collector method (MSCM) utilizing one or more solar/optical radiation waveguides (SOWs) having radiation input, radiation output, and radiation injection ports has been disclosed. The MSCS permits individual SOWs to be cascaded in a modular fashion to permit collection and transmission of incident solar radiation in combination with radiation received from adjacent SOWs. The collection/summation nature of the SOWs may be utilized in vector and/or array configurations to permit collection and transmission of arbitrary areas of incident solar radiation to a focal point, vector, and/or area for the purposes of utilizing the collected radiation for a variety of purposes. The SOWs may optimally incorporate optically reflective areas on surfaces not comprising the radiation input, radiation output, and radiation injection ports to maximize the overall collection and transmission of radiation from the radiation input and radiation injection ports to the radiation output port.

What is claimed is:

1. A Modular Solar Collector System (MSCS) comprising a solar/optical waveguide (SOW) having a waveguide body comprising:
 (a) front top radiation injection port;
 (b) front face radiation input port; and
 (c) rear face radiation output port;
 wherein
 said front top radiation injection port collects incident radiant solar energy from a solar radiation source at a variety of incident angles on the top surface of said waveguide body;
 said incident radiant solar energy is summed within said waveguide body with that of a pass-thru radiation source input into said front face radiation input port to produce a summed radiation result;
 said summed radiation result is emitted at the rear face radiation output port to a solar radiation sink;
 said waveguide body further comprises optically reflective surfaces exclusive of said front top radiation injection port, said front face radiation input port, and said rear face radiation output port; and
 said optically reflective surfaces direct solar energy from said front top radiation injection port and said front face radiation input port to said rear face radiation output port.

2. A Modular Solar Collector System (MSCS) comprising a solar/optical waveguide (SOW) having a waveguide body comprising:
 (a) top surface;
 (b) bottom surface;
 (c) left side surface;
 (d) right side surface;
 (e) front top injection port surface;
 (f) front face input port surface;
 (g) rear face output port surface; and
 (h) bottom injection/input interface surface;
 wherein
 said bottom surface is substantially rectangular and substantially flat;
 said front face input port surface is substantially rectangular and substantially perpendicular to said bottom surface;
 said rear face output port surface is substantially rectangular and substantially perpendicular to said bottom surface;
 said right side surface is substantially perpendicular to said bottom surface;
 said left side surface is substantially perpendicular to said bottom surface;

said top surface has a substantially rectangular perimeter and is not parallel to said bottom surface;

said bottom injection/input interface surface has a substantially rectangular perimeter and is not parallel to said bottom surface;

said rear face output port surface contacts said top surface, said bottom surface, said left side surface, and said right side surface;

said front top injection port surface connects said top surface, said right side surface, said left side surface, and said bottom injection/input interface surface;

said front top injection port surface curves from said top surface to said bottom injection/input interface surface;

said bottom injection/input interface surface connects said front top injection port surface, said right side surface, said left side surface, and said front face input surface;

said top surface, said bottom surface, said right side surface, and said left side surface reflect radiation scattered within said waveguide body; and solar radiation entering said front top injection port surface is combined with radiation input from said front face input port surface to produce a summed radiation result, said summed radiation result being transmitted to said rear face output port surface.

3. The Modular Solar Collector System (MSCS) of claim 2 further comprising a plethora of said solar/optical waveguides arranged in a linear vector configuration
wherein
the front radiation input port of one solar/optical waveguide is coincident with the rear output port of an adjacent solar/optical waveguide; and
solar radiation injected into each of said solar/optical waveguides is collected and transmitted to the rear face output port surface at one end of said linear vector.

4. The Modular Solar Collector System (MSCS) of claim 2 further comprising a plethora of said solar/optical waveguides arranged in an array/planar array configuration
wherein
the front radiation input port of one solar/optical waveguide is coincident with the rear output port of an adjacent solar/optical waveguide; and
solar radiation injected into each of said solar/optical waveguides is collected and transmitted to the rear face output port surface at one edge of said array/planar array.

5. The Modular Solar Collector System (MSCS) of claim 4 wherein said array/planar array is integrated into a solar energy collection system attached to a roofing structure.

6. The Modular Solar Collector System (MSCS) of claim 4 wherein said array/planar array is integrated into a ground-based solar energy collection system supporting pedestrian traffic.

7. The Modular Solar Collector System (MSCS) of claim 5 wherein said array/planar array is integrated into a ground-based solar energy collection system supporting vehicle traffic.

8. The Modular Solar Collector System (MSCS) of claim 5 wherein said rear face output port surface at one edge of said array/planar array supplies solar energy to a solar water purification system.

9. The Modular Solar Collector System (MSCS) of claim 5 wherein said rear face output port surface at one edge of said array/planar array supplies solar energy to a solar water heating system.

10. The Modular Solar Collector System (MSCS) of claim 5 wherein said rear face output port surface at one edge of said array/planar array supplies solar energy to a passive building lighting system.

11. The Modular Solar Collector System (MSCS) of claim 2 wherein said waveguide body comprises a material selected from a group consisting of glass, low lead glass, borosilicate glass, Crown glass, quartz glass, clear plastic, acrylic plastic, polycarbonate plastic, polymethyl methacrylate plastic, and allyl diglycol carbonate (ADC) plastic.

12. The Modular Solar Collector System (MSCS) of claim 2 wherein said front face input port surface is concave and said rear face output port surface is convex.

13. The Modular Solar Collector System (MSCS) of claim 2 wherein said top surface is convex curved from said right side surface to said left side surface.

14. The Modular Solar Collector System (MSCS) of claim 2 wherein said front top injection port surface is convex curved from said right side surface to said left side surface.

15. The Modular Solar Collector System (MSCS) of claim 2 wherein said top surface and said bottom injection/input interface surface are substantially parallel.

16. The Modular Solar Collector System (MSCS) of claim 2 wherein said top surface, said bottom surface, said right side surface, said left side surface, and said bottom injection/input interface surface further comprise a surface treatment selected from a group consisting of: aluminum coating, silver coating attached by vapor deposition, silver nitrate coating, oxide of silver coating, surface index of refraction alteration, pure fused silica coating, pure fused silica coating comprising a negative dopant, and pure fused silica comprising a positive dopant.

17. The Modular Solar Collector System (MSCS) of claim 2 wherein said right side surface is substantially flat, said left side surface is substantially flat, and said right side surface and said left side surface are substantially parallel.

18. The Modular Solar Collector System (MSCS) of claim 2 wherein the plane of said bottom injection/input interface surface forms an angle of approximately 20 degrees with respect to the plane of said bottom surface.

19. The Modular Solar Collector System (MSCS) of claim 2 wherein a plane extending from the intersection of said bottom injection/input interface surface and said front face input port surface to the intersection of said top surface and said front top injection port surface forms an angle of approximately 70 degrees with respect to the plane of said bottom surface.

20. The Modular Solar Collector System (MSCS) of claim 2 wherein said waveguide body further comprises curved internal reflective surfaces to transmit solar radiation from said front top injection port surface and said front face input port surface to said rear face output port surface.

21. A Modular Solar Collector Method (MSCM) wherein said method operates within the context of a Modular Solar Collector System (MSCS) comprising a solar/optical waveguide (SOW) having a waveguide body comprising:
(a) front top radiation injection port;
(b) front face radiation input port; and
(c) rear face radiation output port;
wherein
said front top radiation injection port collects incident radiant solar energy from a solar radiation source at a variety of incident angles on the top surface of said waveguide body;
said incident radiant solar energy is summed within said waveguide body with that of a pass-thru radiation source input into said front face radiation input port to produce a summed radiation result;
said summed radiation result is emitted at the rear face radiation output port to a solar radiation sink;

said waveguide body further comprises optically reflective surfaces exclusive of said front top radiation injection port, said front face radiation input port, and said rear face radiation output port; and said optically reflective surfaces direct solar energy from said front top radiation injection port and said front face radiation input port to said rear face radiation output port;

said method comprising:
(1) Injecting radiant solar energy into said front top radiation injection port of a modular solar collector system (MSCS);
(2) Inputting pass-thru solar energy into said front face radiation input port of said modular solar collector system (MSCS);
(3) Combining said radiant solar energy and said pass-thru solar energy to produce a summed solar energy result;
(4) Transmitting said summed solar energy result to said rear face radiation output port of said modular solar collector system (MSCS); and
(5) Processing the solar energy output from said rear face radiation output port of said modular solar collector system (MSCS) in an attached modular solar collector system (MSCS) or in a terminal solar application.

22. A Modular Solar Collector Method (MSCM) wherein said method operates within the context of a Modular Solar Collector System (MSCS) comprising a solar/optical waveguide (SOW) having a waveguide body comprising:
(a) top surface;
(b) bottom surface;
(c) left side surface;
(d) right side surface;
(e) front top injection port surface;
(f) front face input port surface;
(g) rear face output port surface; and
(h) bottom injection/input interface surface;
wherein
said bottom surface is substantially rectangular and substantially flat;
said front face input port surface is substantially rectangular and substantially perpendicular to said bottom surface;
said rear face output port surface is substantially rectangular and substantially perpendicular to said bottom surface;
said right side surface is substantially perpendicular to said bottom surface;
said left side surface is substantially perpendicular to said bottom surface;
said top surface has a substantially rectangular perimeter and is not parallel to said bottom surface;
said bottom injection/input interface surface has a substantially rectangular perimeter and is not parallel to said bottom surface;
said rear face output port surface contacts said top surface, said bottom surface, said left side surface, and said right side surface;
said front top injection port surface connects said top surface, said right side surface, said left side surface, and said bottom injection/input interface surface;
said front top injection port surface curves from said top surface to said bottom injection/input interface surface;
said bottom injection/input interface surface connects said front top injection port surface, said right side surface, said left side surface, and said front face input port surface; and said top surface, said bottom surface, said right side surface, and said left side surface reflect radiation scattered within said waveguide body;

said method comprising:
(1) Receiving solar energy into injection port of a current solar/optical waveguide;
(2) Receiving solar energy from a prior solar/optical waveguide into the input port of said current solar/optical waveguide;
(3) Combining said solar energy from said injection port and said input port within said current solar/optical waveguide;
(4) Transmitting said combined solar energy from the previous step to the output port of said current solar/optical waveguide;
(5) Repeating for all solar/optical waveguides in the current vector selecting a new current solar/optical waveguide and looping to step (1) as necessary;
(6) Transmitting combined solar energy from the output port of the last solar/optical waveguide in the current vector to a radiation sink;
(7) Repeating for all array waveguide vectors in a solar/optical array by selecting a new solar/optical waveguide vector and looping to step (1) as necessary; and
(8) Transmit the combined solar energy from the output port of the last solar/optical vector to a radiation sink.

23. The Modular Solar Collector Method (MSCM) of claim 22 further comprising a plethora of said solar/optical waveguides arranged in a linear vector configuration
wherein
the front radiation input port of one solar/optical waveguide is coincident with the rear output port of an adjacent solar/optical waveguide; and
solar radiation injected into each of said solar/optical waveguides is collected and transmitted to the rear face output port surface at one end of said linear vector.

24. Modular Solar Collector Method (MSCM) of claim 22 further comprising a plethora of said solar/optical waveguides arranged in an array/planar array configuration
wherein
the front radiation input port of one solar/optical waveguide is coincident with the rear output port of an adjacent solar/optical waveguide; and
solar radiation injected into each of said solar/optical waveguides is collected and transmitted to the rear face output port surface at one edge of said array/planar array.

25. The Modular Solar Collector Method (MSCM) of claim 24 wherein said array/planar array is integrated into a solar energy collection system attached to a roofing structure.

26. The Modular Solar Collector Method (MSCM) of claim 24 wherein said array/planar array is integrated into a ground-based solar energy collection system supporting pedestrian traffic.

27. The Modular Solar Collector Method (MSCM) of claim 25 wherein said array/planar array is integrated into a ground-based solar energy collection system supporting vehicle traffic.

28. The Modular Solar Collector Method (MSCM) of claim 25 wherein said rear face output port surface at one edge of said array/planar array supplies solar energy to a solar water purification system.

29. The Modular Solar Collector Method (MSCM) of claim 25 wherein said rear face output port surface at one edge of said array/planar array supplies solar energy to a solar water heating system.

30. The Modular Solar Collector Method (MSCM) of claim 25 wherein said rear face output port surface at one edge of said array/planar array supplies solar energy to a passive building lighting system.

31. The Modular Solar Collector Method (MSCM) of claim 22 wherein said waveguide body comprises a material selected from a group consisting of glass, low lead glass, borosilicate glass, Crown glass, quartz glass, clear plastic, acrylic plastic, polycarbonate plastic, polymethyl methacrylate plastic, and allyl diglycol carbonate (ADC) plastic.

32. The Modular Solar Collector Method (MSCM) of claim 22 wherein said front face input port surface is concave and said rear face output port surface is convex.

33. The Modular Solar Collector Method (MSCM) of claim 22 wherein said top surface is convex curved from said right side surface to said left side surface.

34. The Modular Solar Collector Method (MSCM) of claim 22 wherein said front top injection port surface is convex curved from said right side surface to said left side surface.

35. The Modular Solar Collector Method (MSCM) of claim 22 wherein said top surface and said bottom injection/input interface surface are substantially parallel.

36. The Modular Solar Collector Method (MSCM) of claim 22 wherein said top surface, said bottom surface, said right side surface, said left side surface, and said bottom injection/input interface surface further comprise a surface treatment selected from a group consisting of: aluminum coating, silver coating attached by vapor deposition, silver nitrate coating, oxide of silver coating, surface index of refraction alteration, pure fused silica coating, pure fused silica coating comprising a negative dopant, and pure fused silica comprising a positive dopant.

37. The Modular Solar Collector Method (MSCM) of claim 22 wherein said right side surface is substantially flat, said left side surface is substantially flat, and said right side surface and said left side surface are substantially parallel.

38. The Modular Solar Collector Method (MSCM) of claim 22 wherein the plane of said bottom injection/input interface surface forms an angle of approximately 20 degrees with respect to the plane of said bottom surface.

39. The Modular Solar Collector Method (MSCM) of claim 22 wherein a plane extending from the intersection of said bottom injection/input interface surface and said front face input port surface to the intersection of said top surface and said front top injection port surface forms an angle of approximately 70 degrees with respect to the plane of said bottom surface.

40. The Modular Solar Collector Method (MSCM) of claim 22 wherein said waveguide body further comprises curved internal reflective surfaces to transmit solar radiation from said front top injection port surface and said front face input port surface to said rear face output port surface.

* * * * *

UNITED STATES PATENT AND TRADEMARK OFFICE
CERTIFICATE OF CORRECTION

PATENT NO. : 8,428,417 B1  
APPLICATION NO. : 13/317309  
DATED : April 23, 2013  
INVENTOR(S) : Glenn Arthur Hastings et al.

Page 1 of 1

It is certified that error appears in the above-identified patent and that said Letters Patent is hereby corrected as shown below:

In the Specification:

Column 2, Line 15, please delete "an" and insert --and--.
Column 2, Line 18, please delete the additional "G" in TRACKING.
Column 2, Line 63, please delete "is".
Column 2, Line 65, please delete "is".

Column 3, Line 8, please insert --is-- after "that".
Column 3, Line 11, please delete "place" and insert --placed--.

Column 5, Line 56, please insert --an-- after "to".

Column 6, Line 1, please insert --the-- after "in".

Column 14, Line 13, please delete "of" after "rating".

Column 16, Line 47, please insert --of-- after "implementation".

Column 21, Line 55, please insert --70-- before "degrees".

Signed and Sealed this
Sixth Day of August, 2013

Teresa Stanek Rea
*Acting Director of the United States Patent and Trademark Office*